(12) United States Patent
Merlin et al.

(10) Patent No.: US 9,961,510 B2
(45) Date of Patent: May 1, 2018

(54) PROTOCOLS FOR MULTIPLE USER FRAME EXCHANGES

(71) Applicant: QUALCOMM Incorporated, San Diego, CA (US)

(72) Inventors: Simone Merlin, Solana Beach, CA (US); Gwendolyn Denise Barriac, Encinitas, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 14/528,452

(22) Filed: Oct. 30, 2014

(65) Prior Publication Data

US 2015/0124689 A1    May 7, 2015

Related U.S. Application Data

(60) Provisional application No. 61/899,121, filed on Nov. 1, 2013.

(51) Int. Cl.
*H04W 24/00*    (2009.01)
*H04W 4/06*    (2009.01)
(Continued)

(52) U.S. Cl.
CPC ............. *H04W 4/06* (2013.01); *H04L 1/009* (2013.01); *H04L 1/0079* (2013.01);
(Continued)

(58) Field of Classification Search
CPC . H04L 1/1685; H04L 12/1868; H04L 12/189; H04L 1/0061; H04L 1/1621; H04L 1/1628; H04L 47/24; H04L 47/26
See application file for complete search history.

(56) References Cited

U.S. PATENT DOCUMENTS 8,976,741 B2    3/2015 Wentink
2008/0095091 A1*    4/2008 Surineni ........... H04W 52/0225
370/311

(Continued)

FOREIGN PATENT DOCUMENTS

EP    2506450 A2    10/2012
EP    2506451 A2    10/2012
(Continued)

OTHER PUBLICATIONS

International Search Report and Written Opinion—PCT/US2014/063368—ISA/EPO—dated Feb. 23, 2015.

*Primary Examiner* — Sai Aung
(74) *Attorney, Agent, or Firm* — Patterson & Sheridan, L.L.P.

(57) ABSTRACT

Certain aspects of the present disclosure provide methods and apparatus for multi user bar protocols and frames. According to certain aspects, an apparatus is provided for wireless communications. The apparatus generally includes a processing system configured to determine that a plurality of devices have a first capability and generate a multi-user (MU) packet that solicits an immediate response from a plurality of the devices, wherein the immediate response comprises an acknowledgment (ACK) or block ACK (BA) and an interface configured to output the MU packet for transmission.

25 Claims, 16 Drawing Sheets

(51) Int. Cl.
*H04L 5/00* (2006.01)
*H04L 29/12* (2006.01)
*H04W 72/00* (2009.01)
*H04L 1/00* (2006.01)
*H04L 1/16* (2006.01)
*H04W 88/08* (2009.01)

(52) U.S. Cl.
CPC .......... *H04L 1/1621* (2013.01); *H04L 1/1664* (2013.01); *H04L 1/1685* (2013.01); *H04L 5/0055* (2013.01); *H04L 61/2069* (2013.01); *H04W 72/005* (2013.01); *H04W 88/08* (2013.01)

(56) References Cited

U.S. PATENT DOCUMENTS

| | | | |
|---|---|---|---|
| 2008/0101498 A1* | 5/2008 | Han | H04L 1/004 375/267 |
| 2010/0046540 A1* | 2/2010 | Nishibayashi | H04L 1/1614 370/445 |
| 2010/0220654 A1 | 9/2010 | Wentink | |
| 2010/0322166 A1 | 12/2010 | Sampath et al. | |
| 2011/0090855 A1 | 4/2011 | Kim | |
| 2011/0096710 A1* | 4/2011 | Liu | H04L 1/1614 370/312 |
| 2011/0268094 A1 | 11/2011 | Gong et al. | |
| 2012/0106371 A1* | 5/2012 | Abraham | H04B 7/0452 370/252 |
| 2012/0177015 A1* | 7/2012 | Nabar | H04B 7/2618 370/337 |
| 2012/0188973 A1 | 7/2012 | Meylan et al. | |
| 2012/0213308 A1* | 8/2012 | Merlin | H04L 1/1621 375/295 |
| 2012/0230317 A1 | 9/2012 | Kim et al. | |
| 2013/0070670 A1 | 3/2013 | Wentink | |
| 2013/0250904 A1 | 9/2013 | Kang et al. | |
| 2015/0124690 A1 | 5/2015 | Merlin et al. | |
| 2017/0163385 A1 | 6/2017 | Merlin et al. | |

FOREIGN PATENT DOCUMENTS

| | | |
|---|---|---|
| JP | 2013511938 A | 4/2013 |
| JP | 2013526153 A | 6/2013 |
| WO | WO-2010099491 A2 | 9/2010 |
| WO | WO-2010099496 A1 | 9/2010 |
| WO | WO-2010148076 A1 | 12/2010 |
| WO | WO-2011019571 A1 | 2/2011 |
| WO | WO-2011130344 A1 | 10/2011 |
| WO | WO-2012125821 A1 | 9/2012 |

* cited by examiner

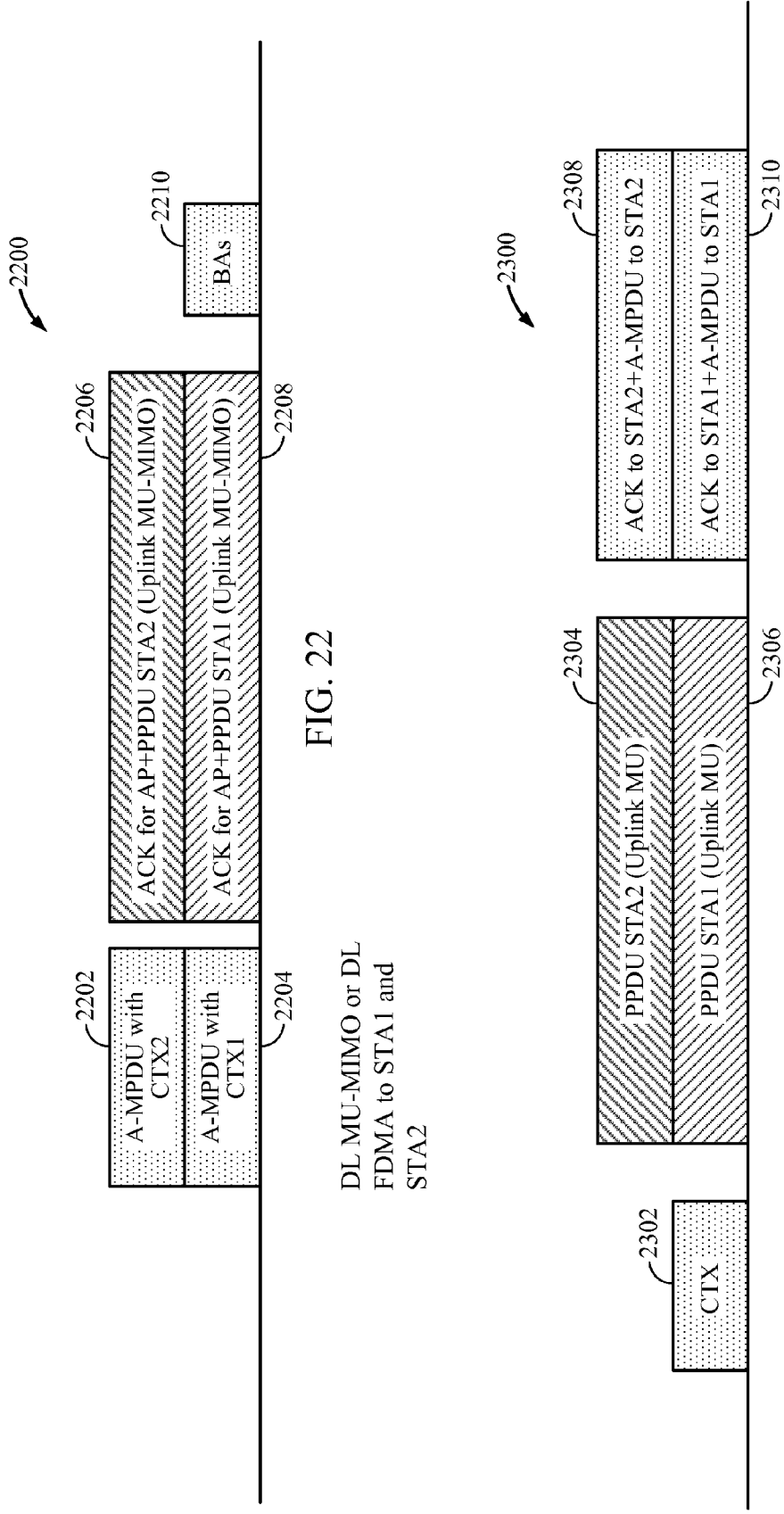

PROTOCOLS FOR MULTIPLE USER FRAME EXCHANGES

CROSS-REFERENCE TO RELATED APPLICATION(S)

This application claims benefit of U.S. Provisional Patent Application Ser. No. 61/899,121, filed Nov. 1, 2013, which is herein incorporated by reference in its entirety.

BACKGROUND

Field of the Disclosure

Certain aspects of the present disclosure generally relate to wireless communications and, more particularly, to frame structures and protocols for uplink multiple user (MU) frame exchanges.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to frame structures and protocols for uplink multiple user (MU) frame exchanges.

Certain aspects of the present disclosure provide an apparatus for wireless communications. The apparatus generally includes a processing system configured to determine that a plurality of devices have a first capability and generate a MU packet that solicits an immediate response from a plurality of the devices, wherein the immediate response comprises an acknowledgment (ACK) or block ACK (BA), and an interface configured to output the MU packet for transmission.

Certain aspects of the present disclosure provide a method for wireless communications. The method generally includes determining that a plurality of devices have a first capability, generating a MU packet that solicits an immediate response from a plurality of the devices, wherein the immediate response comprises an ACK or BA, and outputting the MU packet for transmission.

Certain aspects of the present disclosure provide an apparatus for wireless communications. The apparatus generally includes means for determining that a plurality of devices have a first capability, means for generating a MU packet that solicits an immediate response from a plurality of the devices, wherein the immediate response comprises an ACK or BA, and means for outputting the MU packet for transmission.

Certain aspects of the present disclosure provide an access point for wireless communications with a plurality of stations. The access point generally includes at least one antenna, a processing system configured to determine that a plurality of devices have a first capability and generate MU packet that solicits an immediate response from a plurality of the devices, wherein the immediate response comprises an ACK or BA, and a transmitter configured to transmit, via the at least one antenna the MU packet.

Certain aspects of the present disclosure provide a computer program product for wireless communications with a plurality of stations. The computer program product generally includes a computer readable medium having instructions stored thereon for determining that a plurality of devices have a first capability, generating a MU packet that solicits an immediate response from a plurality of the devices, wherein the immediate response comprises an ACK or BA, and outputting the MU packet for transmission.

Certain aspects of the present disclosure provide an apparatus for wireless communications. The apparatus generally includes a processing system configured to: determine that a plurality of devices have a first capability, generate a MU packet that solicits a first immediate response from each of a first set of the plurality of devices, and generate a second MU packet that solicits a second immediate response from each of a second set of the plurality of devices, wherein the second MU packet is different than the first MU packet, and an interface configured to output the first MU packet and the second MU packet for transmission.

Certain aspects of the present disclosure provide a method for wireless communications. The method generally includes determining that a plurality of devices have a first capability, generating a first MU packet that solicits a first immediate response from each of a first set of the plurality of devices, generating a second MU packet that solicits a second immediate response from each of a second set of the plurality of devices, wherein the second MU packet is different than the first MU packet, and outputting the first MU packet and the second MU packet for transmission.

Certain aspects of the present disclosure provide an apparatus for wireless communications. The apparatus generally includes means for determining that a plurality of devices have a first capability, means for generating a first MU packet that solicits a first immediate response from each of a first set of the plurality of devices, means for generating a second MU packet that solicits a second immediate response from each of a second set of the plurality of devices, wherein the second MU packet is different than the first MU packet, and means for outputting the first MU packet and the second MU packet for transmission.

Certain aspects of the present disclosure provide a computer program product for wireless communications with a plurality of stations. The computer program product generally includes a computer readable medium having instructions stored thereon for determining that a plurality of devices have a first capability, generating a first MU packet that solicits a first immediate response from each of a first set of the plurality of devices, generating a second MU packet that solicits a second immediate response from each of a second set of the plurality of stations, wherein the second MU packet is different than the first MU packet, and outputting the first MU packet and the second MU packet for transmission.

Certain aspects of the present disclosure provide an access point for wireless communications with a plurality of stations. The access point generally includes at least one antenna, a processing system configured to determine that a plurality of devices have a first capability, generate a first MU packet that solicits a first immediate response from each of a first set of the plurality of devices, and generate a second MU packet that solicits a second immediate response from each of a second set of the plurality of devices, wherein the second MU packet is different than the first MU packet; and a transmitter configured to transmit, via the at least one antenna, the first MU packet and the second MU packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 22 illustrates an example frame exchange with UL ACKs aggregated in UL MU-MIMO/FDMA PPDUs, in accordance with certain aspects of the present disclosure.

FIG. 23 illustrates an example frame exchange with UL ACKs aggregated in UL MU-MIMO/FDMA PPDUs and DL ACKs aggregated in DL MU-MIMO/FDMA A-MPDUs, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
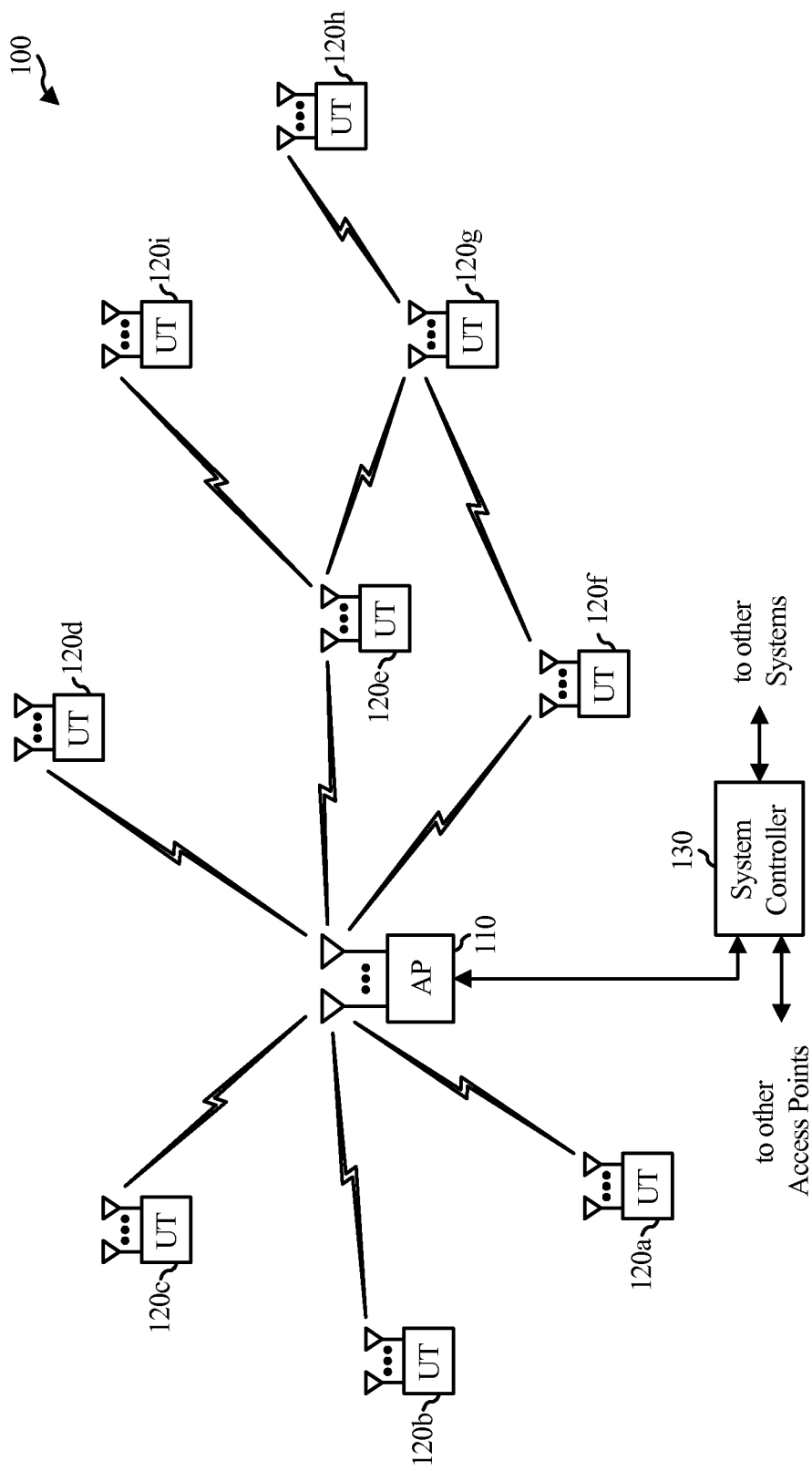
FIG. 1 illustrates a diagram of an example wireless communications network, in accordance with certain aspects of the present disclosure.

Certain aspects of the present disclosure generally relate to wireless communications and, more particularly, to frame structures and protocols for uplink (UL) multiple user (MU) frame exchanges. Certain aspects provide protocol rules and efficient frame exchange sequences to enable sending multiple block acknowledgments (BAs) in UL and/or downlink (DL) MU multiple-input multiple-output (MIMO) and frequency division multiple access (FDMA) systems. According to certain aspects, a multi-STA BA request (BAR) frame may simultaneously solicit multiple immediate BAs. According to certain aspects, frame exchange sequences involve special subframes and/or reverse direction grants (RDGs).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated Media Access Control Protocol Data Unit
AP . . . Access Point
BA . . . Block ACK
BAR . . . Block ACK Request
CRC . . . Cyclic Redundancy Check
DIFS . . . Distributed Interframe Space
EOF . . . End of Frame
EIFS . . . Extended Interframe Space
FCS . . . Frame Check Sequence
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Multiplexing
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
S1G . . . Sub-1-GHz
SDMA . . . Spatial-Division Multiple Access
SIFS . . . Short Interframe Space
SIG . . . Signal
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
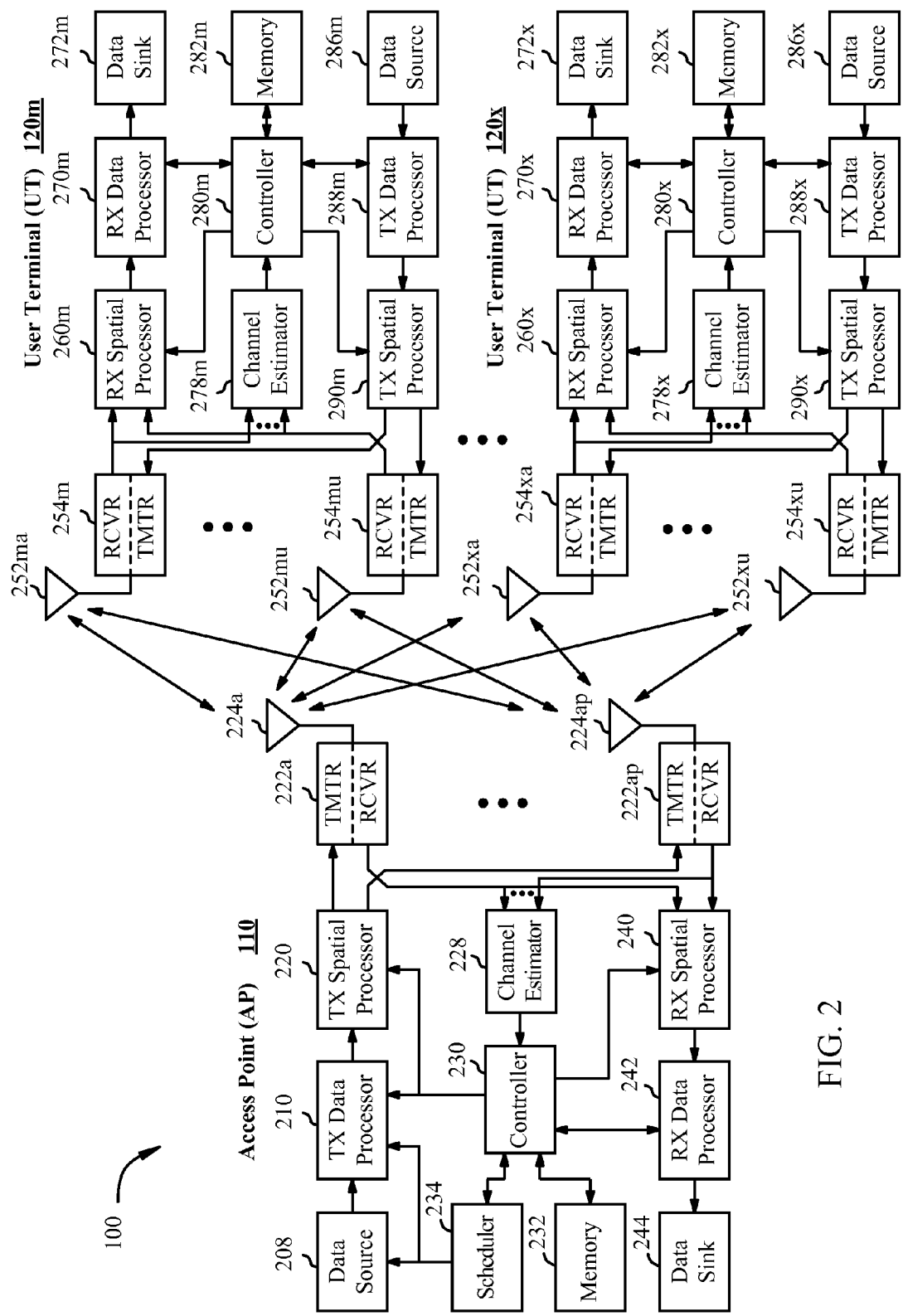
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a pre-coding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
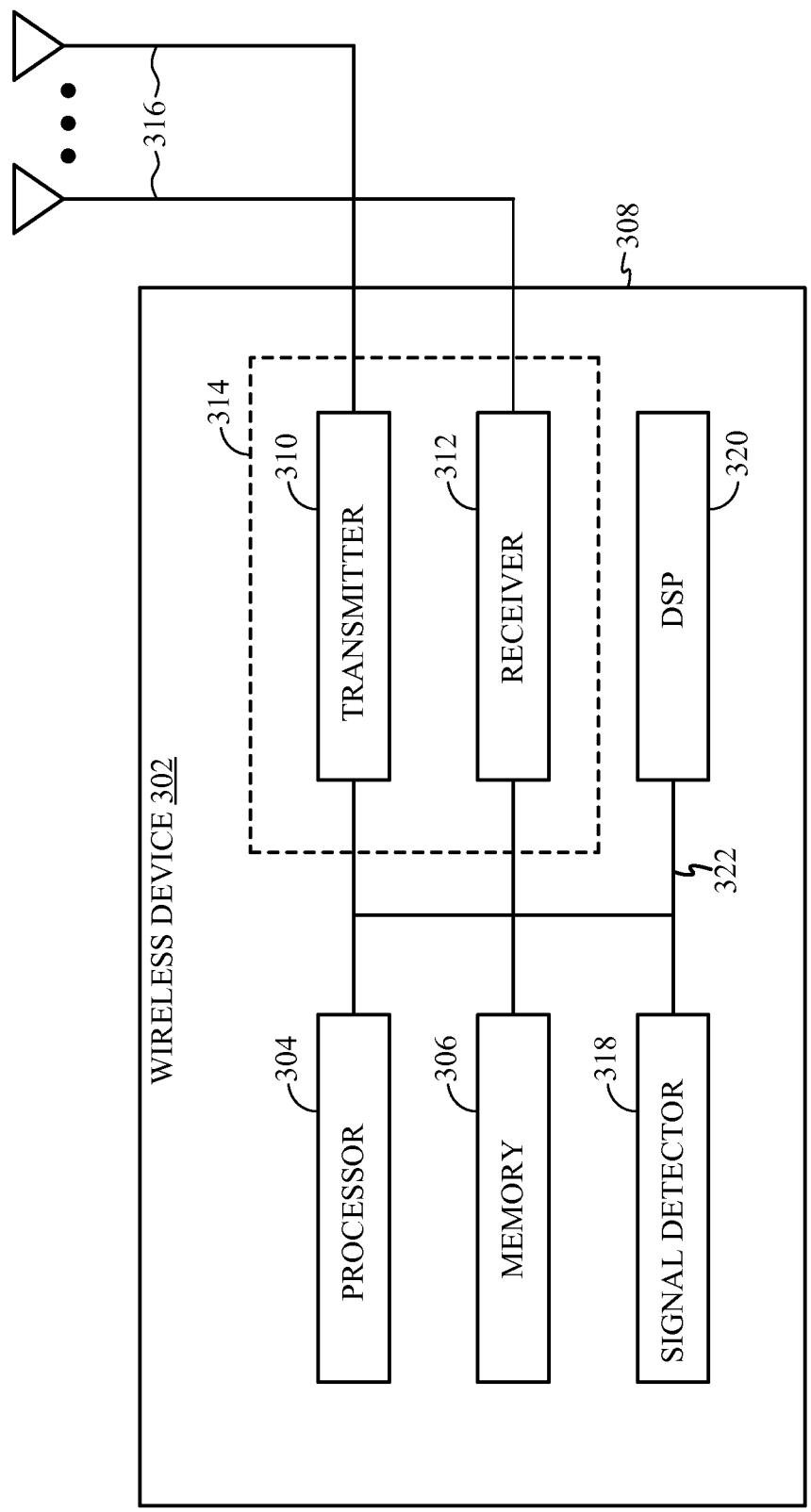
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
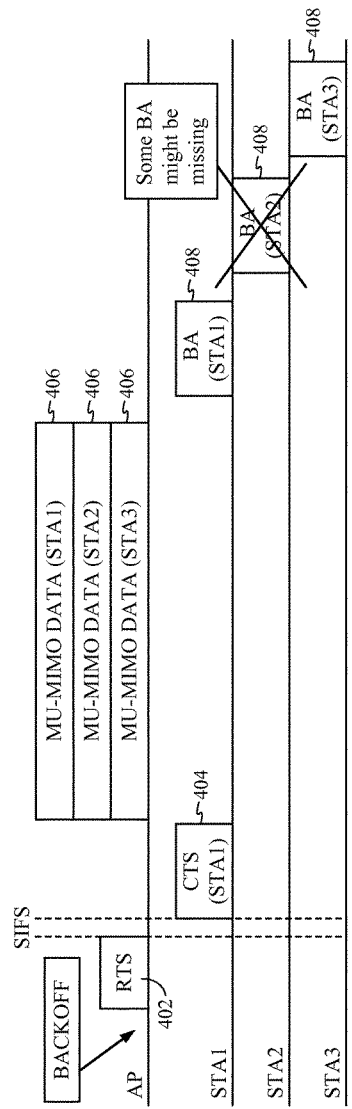
FIG. 4 illustrates an example downlink (DL) multiuser (MU) multiple-input multiple-output (MIMO) between an access point and a plurality of stations.

FIG. 4 illustrates an example downlink multiuser multiple-input multiple-output (DL-MU-MIMO) between an access point and a plurality of stations, in accordance with certain aspects of the present disclosure. To begin, the AP may transmit a Request to Send (RTS) message 402 to one of the STAs (e.g., STA1) selected to receive the DL-MU-MIMO transmission. All data in the MU-MIMO aggregate may be of the same priority class. The RTS message 402 may be sent using contention parameters of a data class in the MU-MIMO aggregate.

Upon receiving the RTS message 402, the selected STA (e.g., STA1) may transmit a Clear to Send (CTS) message 404 to the AP. The RTS message 402 and the CTS message 404 may be separated by a short inter-frame space (SIFS), a small interval between a data frame or other message and its acknowledgment (ACK). In response to receiving the CTS message 404, the AP may send DL-MU-MIMO data 406 to STAs selected by the scheduler (typically part of the processing system of the AP, such as scheduler 234 in FIG. 2). The STAs receiving the MU-MIMO data 406 may transmit BAs 408 in the uplink (UL) in series, starting with the BA for STA1 and ending with the BA for STA3 as shown in FIG. 4. The STA BA transmissions may be separated by SIFS. The order and timing for the STA BA transmissions may be sent in the DL-MU-MIMO data 406.

In DL-MU-MIMO transmissions, multiple packets are sent at the same time toward different STAs. If all the acknowledgments (ACKs) are received, the transmission may be considered successful. If no ACK is received, all the packets presumably failed, and this event may reasonably be interpreted as a collision. If only some of the ACKs are missing, while others are received, then the meaning of this event (e.g., whether this was a collision or a collision for only some of the STAs) and the appropriate reaction in terms of increasing the contention window (CW) may be defined. For example, in FIG. 4, MU-MIMO data 406 was sent to STA1, STA2, and STA3 (access terminals 120), and a BA was subsequently received from each of STA1 and STA3, but not from STA2.

Example Protocols for UL MU Acknowledgments

In radio, multiple-user (MU) multiple-input multiple-output (MIMO) generally refers to MIMO technologies where the available antennas are spread over a number of independent access points (AP) (e.g., such as AP 110) and independent radio terminals (e.g., user terminals (UT) 120)—each having one or multiple antennas. In contrast, single-user (SU) MIMO generally refers to a single multi-antenna transmitter communicating with a single multi-antenna receiver. The performance of MU-MIMO relies on precoding capability of the devices involved.

Frequency division multiple access (FDMA) generally refers to a channel access method used in multiple-access protocols as a channelization protocol. FDMA gives user an individual allocation of one or several frequency bands, or channels. FDMA, like other multiple access systems, coordinates access between multiple users. Orthogonal Frequency-Division Multiple Access (OFDMA) is a multi-user version of OFDM. Multiple access is achieved in OFDMA by assigning subsets of subcarriers to individual users. This allows simultaneous low data rate transmission from several users.

According to certain aspects, a FDMA transmission may consist of, for example, multiple SU or MU PPDUs on each channel (e.g. 20 MHz). Each MU PPDU may be either a MU-MIMO PPDU or a FDMA PPDU. The FDMA PPDU may allocate sub-20 MHz channels. According to certain aspects, PPDUs of the FDMA transmission may be a combination of FDMA, MU-MIMO, OFDMA, and time aggregation within the same PPDU. In this case, the notation "DL MIMO/FDMA" may refer to either a DL FDMA PPDU, a DL MU-MIMO PPDU, a DL OFDMA PPDU, or to a PPDU that does any combination of DL FDMA, DL MU-MIMO and time aggregation to serve multiple STAs. A MU time aggregated PPDU may comprise a single PPDU including an A-MPDU or an A-MSDU where the MPDUs or MSDUs have receiver or destination addresses corresponding to different STAs. A MU time aggregated PPDU may comprise a sequence of SU PPDUs or PSDUs sent with no or very small time separation.

According to certain aspects, the acknowledgment policies, defined in more detail below, may be applied to each PPDU of the FDMA transmission. As a result, the immediate responses generated by the FDMA transmission may be a combination of the immediate responses generated by each PPDU.

Uplink (UL) MU-MIMO or UL FDMA can be used to transmit multiple block acknowledgements (BAs) at the same time, for example, in response to a downlink (DL) MU physical protocol data unit (PPDU). The current standard does not define UL MU-MIMO or UL FDMA and does not allow the above operation mode.

Accordingly, protocol rules and signaling to enable the use of UL MU-MIMO and UL FDMA to send BAs are desirable.

Example UL MU ACKs with UL MU-MIMO/FDMA

Conventionally, in a DL MU-MIMO PPDU, at most one aggregate medium access control (MAC) protocol data unit (A-MPDU) among the A-MPDUs addressed to all very high throughput (VHT) STAs may include MPDUs that solicit an immediate response. According to certain aspects presented herein, this constraint may be relaxed.

The present disclosure provides example frame exchanges and ACK signaling policy to enable sending ACKs/BAs with UL MU-MIMO/FDMA by stations (STAs) receiving a DL MU-MIMO/FDMA PPDU and that are capable of UL MU-MIMO or UL FDMA.

Example ACK Protocol Rules

The present disclosure may define rules for limiting the setting of ACK policies and signaling for allocating MU-MIMO or FDMA resources to the recipient STAs for the replies. Such signaling may include which STAs should are solicited for immediate response (e.g., for immediate BAs), which STAs may use existing ACK policy indications, which mode is to be used for the replies (e.g., UL SU-MIMO, UL MU-MIMO, or UL MU FDMA), and which parameters to use for MU-MIMO or FDMA transmissions.

According to certain aspects, an AP may transmit an MU PPDU soliciting immediate response from multiple high efficiency wireless (HEW) STAs (e.g., very high throughput (VHT) STAs) that support UL MU-MIMO, UL FDMA, or both. Therefore, multiple responses (e.g., ACKs/BAs) to the MU PDDU, from multiple STAs, are possible at the same time. For example, if all of the addressed STAs in the DL MU-MIMO PPDU support UL MU-MIMO, UL FDMA, or both, then none, some, or all of the STAs may be solicited for immediate response. According to certain aspects, the multiple responses may be in different streams and/or different frequencies.

In an example implementation, the AP may solicit multiple immediate responses by transmitting an MU PPDU including multiple aggregate medium access control (MAC) protocol data units (A-MPDUs) having MPDUs that solicit an immediate response (e.g., MPDUs indicate "Immediate BA or normal ACK"). In another example implementation, the AP may solicit multiple immediate responses by transmitting one or more MPDUs in the A-MPDU that indicate a reverse direction grant (RDG) or a speed frame exchange grant. According to certain aspects, the RDG grant or speed frame exchange grant may transfer a transmit opportunity (TXOP) to the recipient STA during which the recipient STA may transmit ACKs/BAs or Data.

According to certain aspects, the DL MU-MIMO/FDMA PPDU may be addressed to a mix of legacy (e.g., non-HEW) STAs and HEW STAs (i.e., some of the addressed STAs support UL MU-MIMO, UL FDMA, or both, and some of the addressed STAs do not). A DL FDMA PPDU addressed to a mix of legacy and HEW STAs may be a legacy PPDU sent on the primary channel and one or more PPDUs sent on other channels. According to certain aspects, if the AP transmits an MU PPDU soliciting an immediate response from a non-HEW STA, then no other STA receiving the MU PPDU may be solicited for immediate response. For example, if a physical layer convergence protocol (PLCP) service data unit (PSDU) (e.g., A-MPDU) in the MU PPDU addressed to a non-HEW STA solicits an immediate response, then no other PSDUs in the same MU PPDU can solicit an immediate response. In this case, the MPDU soliciting the immediate response may be set to "immediate response" and the MPDUs to the other STAs may be set to a "No ACK" policy, a "delayed BA" policy, or a "BAR" policy. According to certain aspects, under the assumption that uplink transmissions from a legacy STA and one or more HEW STAs can be performed by using appropriate UL FDMA or MU-MIMO protocols, the PSDU addressed to a non-HEW STA and the PSDU/MPDU addressed to one or more HEW STAS that all support UL MU-MIMO or UL FDMA may solicit an immediate response from the HEW STAs. For example, all MPDUs for the HEW STAs may be set to "immediate response". Alternatively, none of the STAs may be solicited for immediate response. For example, all MPDUs may be set to a "No ACK" policy or "delayed BA" policy. Accordingly, a single or multiple STAs may be solicited for immediate response, so long as none of the addressed non-legacy STAs is solicited for immediate response.

According to certain aspects, if none of the addressed STAs in the DL MU-MIMO PPDU support UL MU-MIMO, UL FDMA, or both, at most a single one of the STAs may be solicited for immediate response. In one example implementation, none of the STAs is solicited for immediate response.

According to certain aspects, multiple simultaneous responses may be solicited, even if one of the STAs does not support UL FDMA or UL MU-MIMO (e.g., a legacy STA or a HEW STA not supporting UL FDMA or UL MU-MIMO). For example, a legacy STA may respond with a regular SU transmission on a primary channel, while other capable STAs may respond at the same time on other channels. In some cases, a capable STA may partially support UL FDMA or UL MU-MIMO by limiting bandwidth or limiting the number of spatial streams of its response in a primary channel to favor UL-FDMA or UL MU-MIMO transmissions on other channels/streams by other STAs.

Indication of Response Type for ACKs

According to certain aspects, each recipient STA that is requested to send an immediate response may know—or be indicated—how the immediate reply (e.g., ACK/BA) should be sent. For example, the requested STA may know or be indicated whether to reply with SU-MIMO, MU-MIMO, or FDMA. The PHY preamble mode to be used may be different depending on technique is to reply.

In a DL MIMO/FDMA or MU time aggregated PPDUs, except for the PHY header, the data portion may be received only by the intended (e.g., addressed) STAs. Since the ACK policy may be included in the data portion, each STA may not know the ACK policy, or any other setting included in the data portion, set for other STAs. Thus, each STA may be individually and robustly informed of the type of response.

Option 1:

According to certain aspects, a response type indication for each STA may be added in each MPDU or PSDU. For example, 1 or 2 bits may indicate which mode of response is to be used (e.g., UL SU-MIMO, UL MU-MIMO, or UL FDMA). For a response type indication in each MPDU, the indication may be included in the Quality of Service (QoS) control field, the HT or VHT Control field, the frame control (FC) field, the A-MPDU delimiter preceding the MPDU, an extended MAC header, or a A-MPDU delimiter with additional fields. For a response type indication in the PSDU, the indication may be included in the SERVICE field, for example. Alternatively, the indication may be included in PHY header.

Option 2:

According to certain aspects, a second option for indicating the response type may be to aggregate an additional "special" frame into the A-MPDU from which the STA can know the response type and parameters. For example, if the special subframe is received, the STA may reply according to an allocation defined by the special subframe. According to certain aspects, the special subframe may have a token number associated with a schedule for the response and the STA may reply according to the schedule. Alternatively, if the special subframe is not received, the STA may know to reply with a SU-MIMO transmission or the STA may know not to reply.

Option 3:

According to certain aspects, a third option may be a combination of the first and second options. For example, 1 or 2 bits (in the MPDU, PSDU, or PHY header) may indicate which mode for the STA to use for response (e.g., as in the first option). If the 1 or 2 bits indicate that the response type is SU-MIMO, the STA may reply with a SU transmission. However, if the 1 or 2 bits indicate that the response type is MU-MIMO/FDMA, and if a special frame is received (e.g., as in the second option), the STA may reply according to the allocation defined by the special subframe. Alternatively, if the 1 or 2 bits indicate that the response type is MU and if a special frame is not received, then the STA may know not to reply.

Option 4:

According to certain aspects, a fourth option may be to define a "static" agreement between the AP and recipient STAs on how the immediate replies should be sent. According to certain aspects, the agreement may be per STA, per group of STAs, or statically defined in the wireless standards. The agreed mode for immediate replies may be communicated by the AP in a management frame (e.g., in a beacon, probe response, or action frame). In an example implementation, each DL MU-MIMO group ID used for DL MU-MIMO transmission may be associated with the mode that is to be used for the immediate reply (e.g., UL SU-MIMO, UL MU-MIMO, or UL MU FDMA). In this case, the Action frame (e.g., 802.11ac GroupID Action frame), may include 1 or 2 bits in the User Position Array field or in a new per group field.

Option 5:

In another example implementation, rules may be defined (e.g., in the wireless standards) for deriving the type of response to be used based on the type of the received PPDU. For example, if a DL SU PPDU is received, the reply may use SU; if a DL FDMA PPDU is received, the reply may use FDMA, and if a DL MU-MIMO PPDU is received, the reply may use UL MU-MIMO.

According to certain aspects, the AP may simply indicate if UL FDMA/MU-MIMO BAs are activated or not in a beacon, an association response, or in a management frame.

Indication of Parameters for Response Using MU-MIMO/FDMA

According to certain aspects, if a STA determines (e.g., receives an indication, derives, statically agrees, or is configured) that UL MU-MIMO or FDMA is to be used for an immediate response, the STA may also know which parameters to use for the response. Response parameters may include, for example, which spatial streams/channels to use, what duration to use, and what power to use for the immediate response. According to certain aspects, one or more of these parameters may be indicated with any one of the following options or a combination thereof (e.g., some parameters may be conveyed according one option and other parameters according another option).

Figure 5:
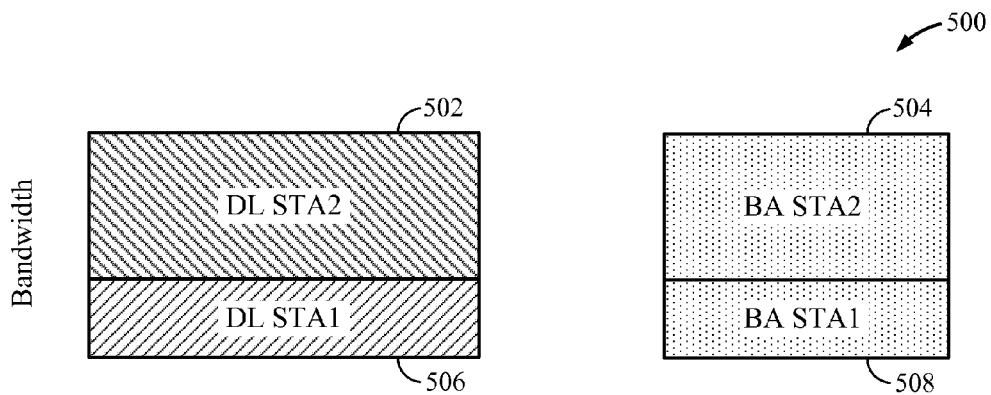
FIG. 5 illustrates an example frame exchange with bandwidths used for response frames equal to the bandwidth used for the frames soliciting the responses, in accordance with certain aspects of the present disclosure.

Option 1:

According to certain aspects, a first option to indicate response parameters may be to extend existing rules for the immediate response bandwidth (BW) and modulation and coding schemes (MCSs). For example, the bandwidth and channels of response frame may be equal to the bandwidth and channels of the soliciting frame, as shown in FIG. 5. As shown in the frame exchange 500 illustrated in FIG. 5, the bandwidth 502 used for the soliciting immediate response from STA2 is equal to the bandwidth 504 used by STA2 for the reply (BA STA2). Similarly, the bandwidth 506 used for the soliciting immediate response from STA1 is equal to the bandwidth 508 used by STA1 for the reply (BA STA1). According to certain aspects, if the soliciting frame is a DL FDMA PPDU, the bandwidth of the response frame may be equal to the bandwidth of the soliciting frame used only for transmitting to the particular recipient STA that is replying. According to certain aspects, the MCS may be derived as a function of the request MCS and may also account for the bandwidth. According to certain aspects, the mapping may be defined by the wireless standards or may be indicated by the AP.

According to certain aspects the bandwidth of the response may be fixed to a certain value by AP or by the standard; as an example, the bandwidth may be set to a value equal for all responders. As an example, the response may be set to the smallest response supported by each STA, or by all the STAs.

Figure 6:
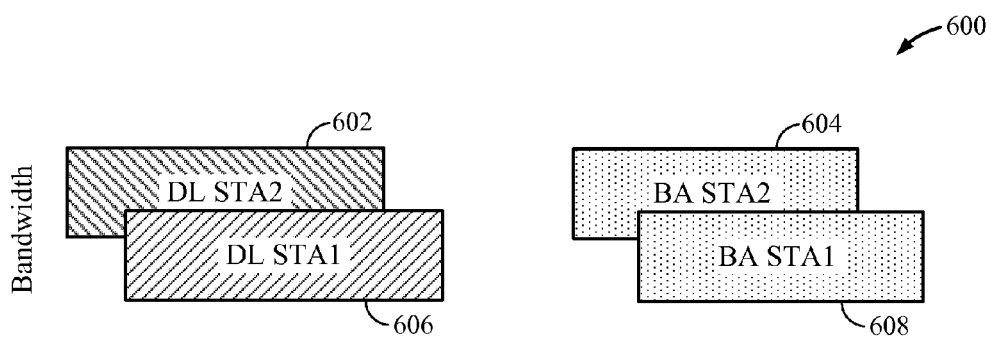
FIG. 6 illustrates an example frame exchange with spatial streams used for response frames equal to the spatial streams used for the frames soliciting the responses, in accordance with certain aspects of the present disclosure.

According to certain aspects, STAs may send the response frame using the same spatial streams of the soliciting frame (e.g., number and position of spatial streams), as shown in FIG. 6. As shown in the frame exchange 600 illustrated in FIG. 6, the soliciting frame for STA2 may use a first spatial stream 602 and the STA2 may reply using the same spatial stream 604. Similarly, the soliciting frame for STA1 may use a second spatial stream 606 and the STA1 may reply using the same spatial stream 608. According to certain aspects, the recipient STA and the soliciting AP may not support transmission of the same spatial streams or the same number of spatial streams. In this case, the STA may use a pre-defined subset of N spatial streams. The AP may be aware of STAs supported streams and may, for example, only transmit on the pre-defined subset of spatial streams. As an example assume AP serves STAs 1 through 4 with the following stream allocation {1 and 2, 3 and 4, 5 and 6, 7 and 8}. STAs 1 and 2 may respond on steams 1 and 2, 3 and 4 respectively, while STA 3 and 4 may respond on stream 5 and 7 respectively, not being able to use 2 streams. According to certain aspects, the subset of N spatial streams may be defined in the wireless standards. As an example, the AP or the standard may indicate that all responses must be sent with 1 spatial stream only. The assignment of the spatial stream to the responding STAs may follow the same STAs ordering defined in the DL MU PPDU, as indicated by the group ID or by the list of STAs identifiers in the DL MU PPDU. According to certain aspects, the duration for the response may be fixed by the AP or may be indicated to the STA by the AP.

Figure 7:
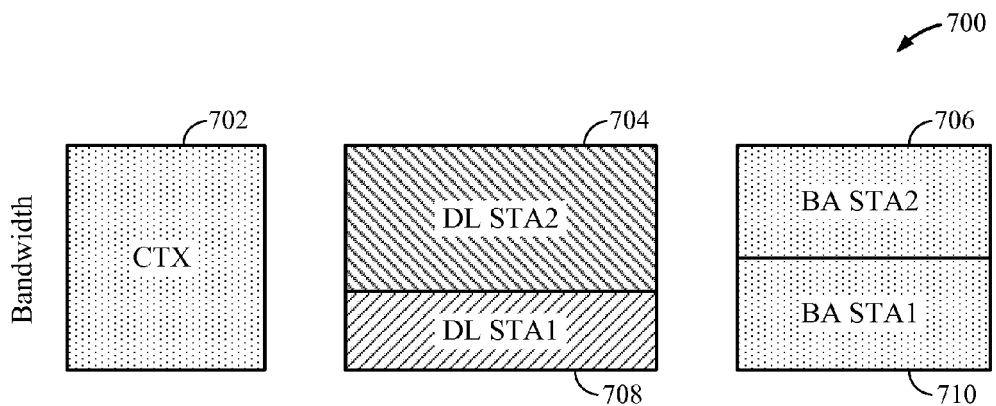
FIG. 7 illustrates an example frame exchange with a special frame sent before a frame soliciting responses to indicate parameters for the responses, in accordance with certain aspects of the present disclosure.

Option 2:

According to certain aspects, a second option to indicate response parameters may be where the parameters are pre-agreed between the AP and STA. According to certain aspects, the pre-agreed parameters may be exchanged. For example, the pre-agreed parameters may be exchanged when the STA associates with the AP (e.g., in the probe response or association response). In another example, the AP may indicate the pre-agreed parameters in a management/control frame sent to each STA or group of STAs at some time before sending the DL MU PPDU. For example, before sending the DL MU PPDU, the AP may send a special frame indicating the pre-agreed parameters, as shown in FIG. 7. As shown in the frame exchange 700 illustrated in FIG. 7, a special frame 702 is sent before the frames 704 (DL STA2) and 708 (DL STA1) soliciting immediate responses from STA2 and STA1, respectively. The special frame 702 may provide the pre-agreed parameters for the response frames 706 (BA STA2) and 710 (BA STA1) from STA2 and STA1, respectively.

Alternatively, the AP may send a management action frame right before the DL MU PPDU to exchange the pre-agreed parameters. According to certain aspects, the pre-agreed parameters may be defined in the wireless standards (e.g., all BAs may use one stream with the smallest bandwidth).

Option 3:

According to certain aspects response parameters may be statically allocated. For example, in a third option, each Group ID used for DL MU-MIMO transmission may be associated with some or all of the parameters to be used for either UL MU-MIMO or UL FDMA replies. According to certain aspects, the Group ID may be received in the PHY preamble of the received DL MU PPDU. As an example, the Group ID may be associated with the bandwidth and stream allocation for the UL responses.

Option 4:

In a fourth option, response parameters for UL MU-MIMO and UL FDMA replies may be dynamically allocated and indicated to each STA in the received DL PSDU. For example, the parameters may be included in each MPDU (e.g., in the QoS control field or in the FC field), in the A—MPDU delimiter preceding the MPDU, or in an extended MAC header. The parameters may also be included in the PSDU (e.g., in the SERVICE field) or in the PHY header (e.g., in one of the signal (SIG) fields). In this case the presence of the field indicating the parameters to be used for the response may be signaled by one of the following options: use of a reserved bit in the QoS Control field, use of a reserved bit in the HT control field, use of a reserved bit in the SERVICE field, use of a reserved bit in the A-MPDU delimiter, or implicitly indicated by whether the type of DL PPDU is DL MU-MIMO or DL OFDMA.

Figure 8:
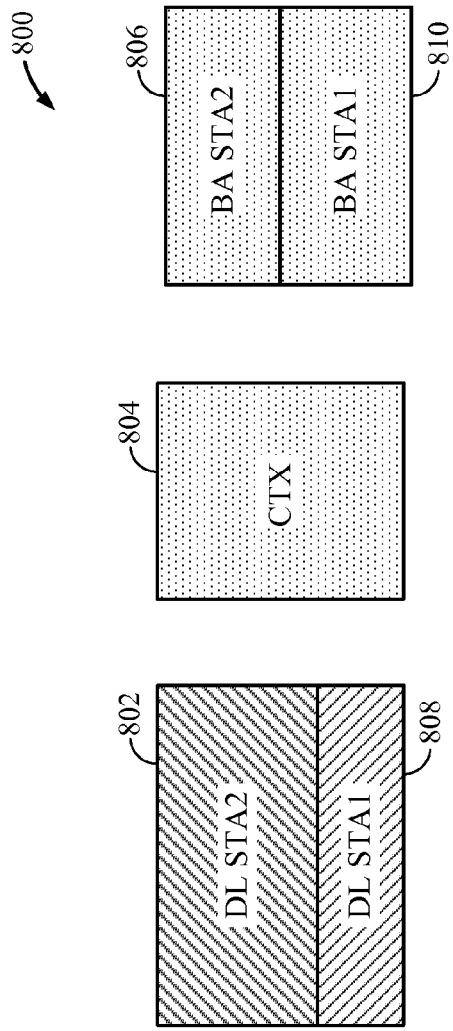
FIG. 8 illustrates an example frame exchange with a special subframe, to indicate parameters for responses, sent in a separate frame following the frame soliciting the responses, in accordance with certain aspects of the present disclosure.

Option 5:

According to certain aspects, a fifth option to indicate the response parameters may be in a special frame aggregated in the A-MPDU. According to certain aspects, each special frame may be received by one STA and may include the parameter information for that STA only. Alternatively, the special frame(s) (e.g., one special frame per STA or a single broadcast special frame) may be sent in a separate PPDU following the data DL PPDU, as shown in FIG. 8. As shown in the frame exchange 800 illustrated in FIG. 8, the special frame 804 indicating the parameters for the immediate responses 806 (BA STA2) and 810 (BA STA1) from STA2 and STA1, respectively, may be send in a separate DL PPDU following the DL PPDUs 802 (DL STA2) and 808 (DL STA1) soliciting immediate responses from STA2 and STA1, respectively. The special frame may be a trigger frame or a modified BAR frame.

Example BAR Frames with UL MU-MIMO/FDMA

As discussed above, according to certain aspects of the present disclosure, an AP may solicit immediate responses from multiple HEW STAs (e.g., VHT STAs) that all support UL MU-MIMO, UL FDMA, or both. For example, a DL MU-MIMO/FDMA PPDU may have more than one PSDU addressed to HEW STAs having MPDUs with "Immediate BA or ACK response" policies that solicit an immediate BA or ACK response from the recipient HEW STAs. Also as discussed above, it may be desirable for the solicited STAs to know which transmission mode (e.g., SU, UL MU-MIMO, or UL FDMA) to use for the replies and what parameters to use for the replies if UL MU-MIMO or UL FDMA is to be used as the transmission mode for the replies.

Various options were provided above for indicating the type of reply and the response parameters to use for the replies. In certain implementations discussed above, the response parameters may be included in a special frame. If the special frame is not decoded correctly, the recipient STA will not respond.

Example SU BAR Frame

According to certain aspects, block acknowledgement request (BAR) frames may be used to poll for (e.g., solicit) block acknowledgments (BA). As described above, UL MU-MIMO or UL FDMA may be used to transmit multiple BAs at the same time, hence, it may be useful to define a BAR frame which can solicit multiple immediate responses.

According to certain aspects of the present disclosure, a SU BAR that carries additional information is defined that can be used in a DL MU PPDU to solicit multiple UL immediate responses as well as to provide allocation of resources for sending the BAs.

According to certain aspects of this disclosure, the BAR frame may be aggregated in an A-MPDU that is part of the DL MU PPDU and the BAR frame may be targeted to a single user. For example, each STA that is a recipient of the DL MU PPDU may receive a potentially different BAR, requesting a BA and granting the resources for that STA to reply. Each STA may be granted a different resource.

Figure 9:
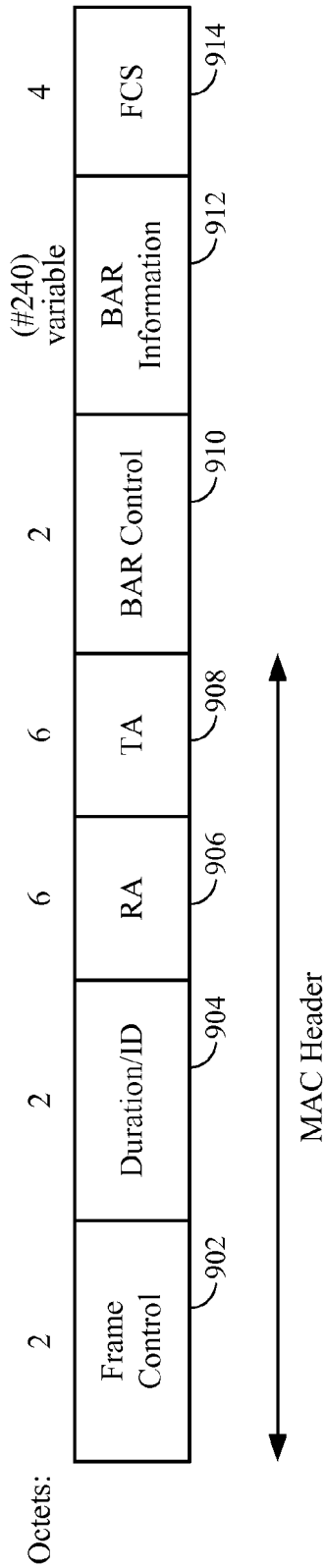
FIG. 9 illustrates an example of a block acknowledgment request (BAR) frame, in accordance with certain aspects of the present disclosure.

As mentioned above, in addition to requesting BAs, the BAR frame may also allocated resources for the BAs, indicate the transmission mode for the replies, and indicate parameters to be used for the replies. According to certain aspects, it may be desirable to use reserved bits in the existing BAR frame or to add fields to the existing BAR frame to indicate the response type and/or response parameters. FIG. 9 illustrates an example BAR frame 900, in accordance with certain aspects of the present disclosure. As shown in FIG. 9, the BAR frame 900 may include a frame control field 902, duration/ID field 904, receiver address field 906, transmitter address field 908, BAR control field 910, BAR information field 912, and frame check sequence field 914. According to certain aspects, some of the 8 reserved bits in the BAR control field 910 may be used for the variable length BAR information field 912 to indicate the resource allocation for the responses. According to certain aspects, 1 or 2 bits of the BAR information field 912 may be used to indicate which mode of response is to be used (e.g., SU, UL MU-MIMO, or UL FDMA). For example, SU may be indicated by 00, MU-MIMO may be indicated by 01, and FDMA may be indicated by 10. If UL MU-MIMO or UL FDMA are to be used, then the parameters to be used (e.g., duration of the response PPDU, spatial stream/channel allocation, and power allocation) may also be indicated by bits in the BAR frame as described above. If the response parameters are not indicated, the default or the pre-agreed response parameters may be used.

According to certain aspects, the BA policy for all data MPDUs may be set to BA (no immediate response), so that if the BAR is not correctly received, no immediate response is generated.

Figure 10:
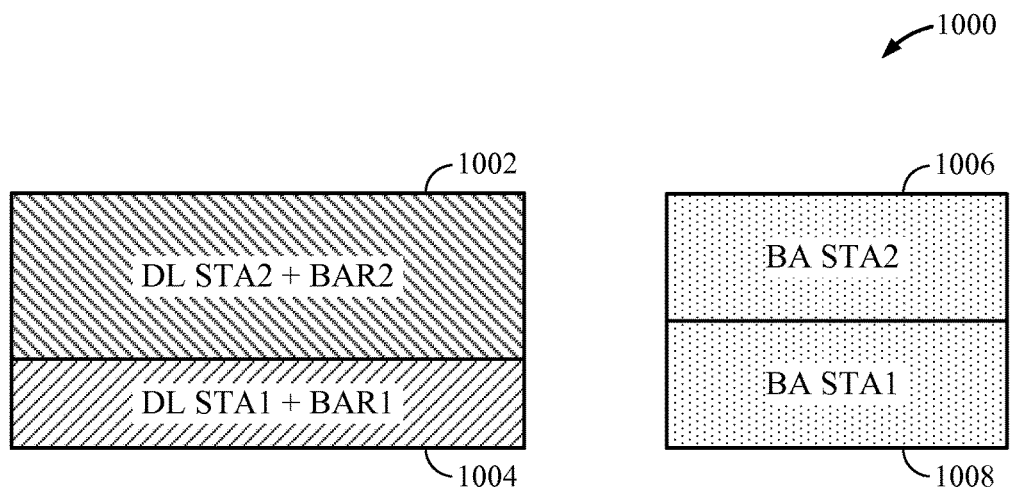
FIG. 10 illustrates an example frame exchange of a DL aggregated medium access control (MAC) protocol data unit (A-MPDU) including a BAR frame per each station (STA), in accordance with certain aspects of the present disclosure.

FIG. 10 illustrates an example frame exchange 1000 of a DL A-MPDU including a BAR frame per each STA, in accordance with certain aspects of the present disclosure. As shown in FIG. 10, a different BAR frame for each STA may be aggregated in the DL A-MPDUs for each STA. For example, BAR frame 1002 (DL STA2+BAR2) and BAR frame 1004 (DL STA1+BAR1) may be aggregated into A-MPDU and may solicit BAs 1006 (BA STA2) and 1008 (BA STA1) from STAs 2 and 1, respectively.

Figure 11:
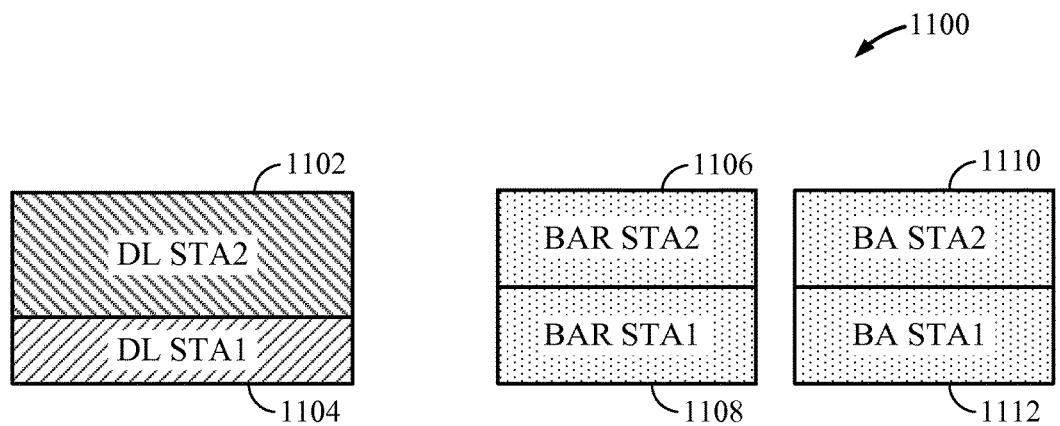
FIG. 11 illustrates an example frame exchange of a BAR frame per each STA sent in a separate MU physical layer convergence protocol (PLCP) protocol data unit (PPDU) frame following the DL MU-MIMO/FDMA A-MPDU frame to the STAs, in accordance with certain aspects of the present disclosure.

According to certain aspects, the BAR frames may not be aggregated in the DL A-MPDU. FIG. 11 illustrates an example frame exchange 1100 of a BAR frame per each STA sent in a separate MU physical layer convergence protocol (PLCP) protocol data unit (PPDU) frame following the DL A-MPDU frame to the STAs, in accordance with certain aspects of the present disclosure. As shown in FIG. 11, BAR frames 1106 and 1108 may be sent in a separate DL PPDU subsequent to the DL A-MPDU having data PSDUs 1102 and 1104 addressed to STA2 and STA1, respectively.

Example Multi-STA BAR Frames

According to certain aspects, a multi-STA BAR frame may be used to request BAs from multiple STA. According to certain aspects, the multi-STA BAR frame may be sent as a broadcast or multicast frame, directed to multiple STAs that are requested to send a BA. As for the SU BAR frame describe above, the multi-STA BAR frame may also include indications for the resources that each STA may use for sending the BA.

Figure 12:
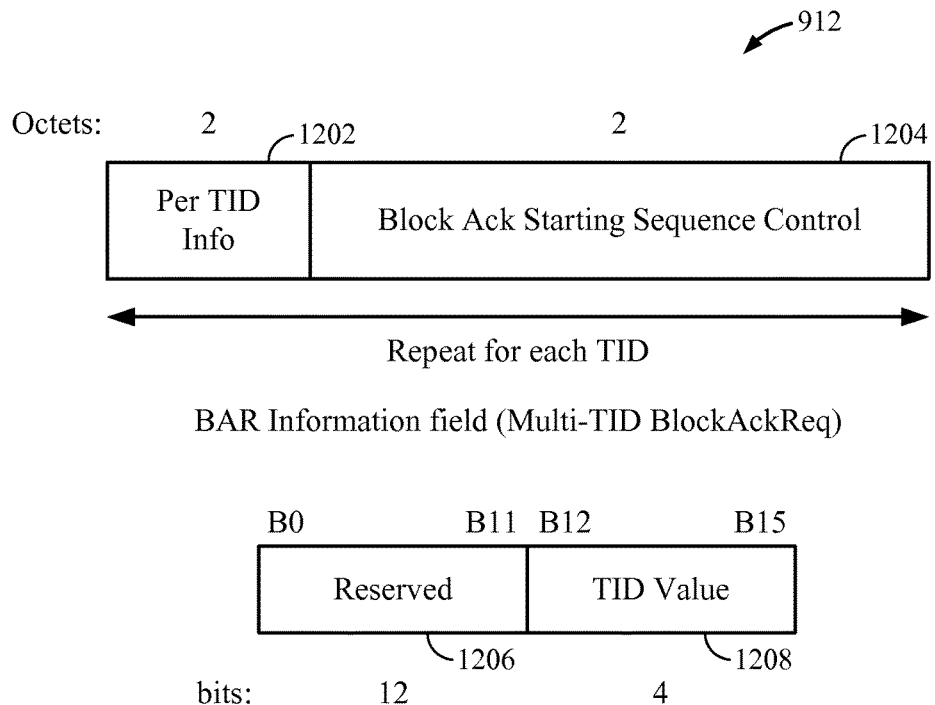
FIG. 12 illustrates an example format for a multi-TID BAR, in accordance with certain aspects of the present disclosure.

According to certain aspects, the multi-STA BAR may use the format of a multi-traffic indicator (TID) BAR frame, as shown in FIG. 12. The multi-STA BAR may use some of the reserved bits in the BAR control field, in the PER-TID information field, or in other existing fields to indicate: that the BAR is a multi-STA BAR, which STAs are the recipients, the duration of the allowed response, and resource allocation for the replies in UL MU-MIMO or UL FDMA. For example, for each TID, the Bar information field 912 may include a Per TID Info subfield 1202 and a Block Ack Starting Sequence Control subfield 1204.

According to certain aspects, the multi-STA BAR frame may include an indication that the BAR is a multi-STA BAR using a new subtype or extended type in the frame control (FC) field. For example, using 1 reserved bit in the FC field. Alternatively, sending the BAR with a broadcast/multicast destination address may indicate that the BAR is a multi-STA BAR frame.

According to certain aspects, indicating which STAs are the recipients may be accomplished by using the 12 reserved bits in the PER-TID field 1202 to indicate a partial or local identifier of each STA (e.g., the AID, partial AID, or partial MAC address of each STA).

According to certain aspects, indicating the duration of the allowed response may be accomplished by using the reserved bits in the Bar control field 1206 to indicate the allowed response PPDU duration. Also, it may be assumed that the Duration field 902 indicates the allowed PPDU duration.

According to certain aspects, indicating the resource allocation for the STAs to send in UL MU-MIMO or UL FDMA may be accomplished by including the spatial stream/channel allocation and power control for each STA.

Figure 13:
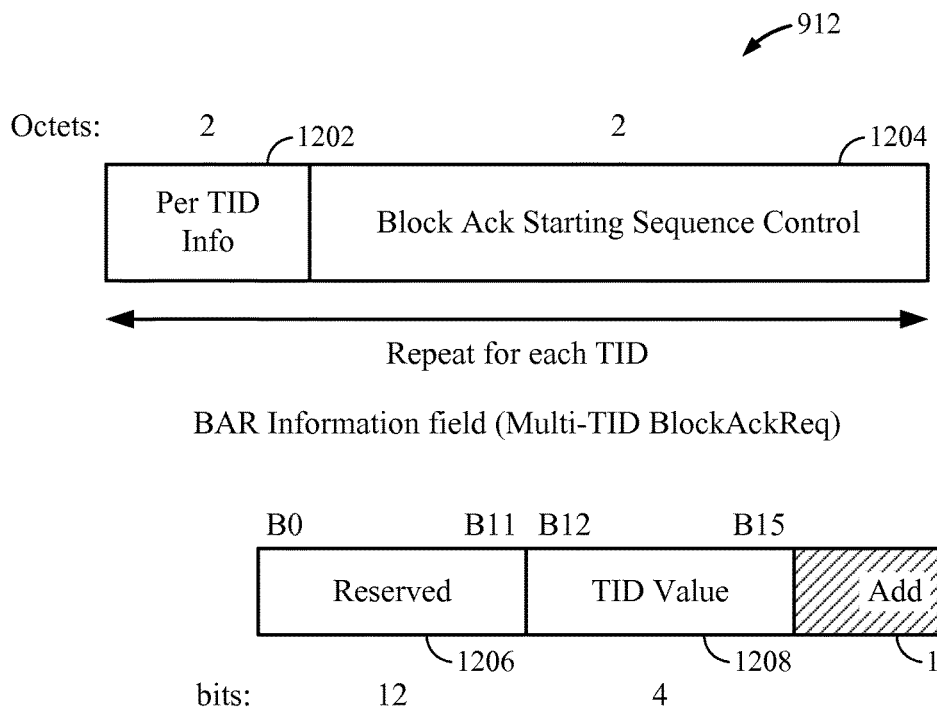
FIG. 13 illustrates an example format for a multi-STA BAR, in accordance with certain aspects of the present disclosure.
Figure 14:
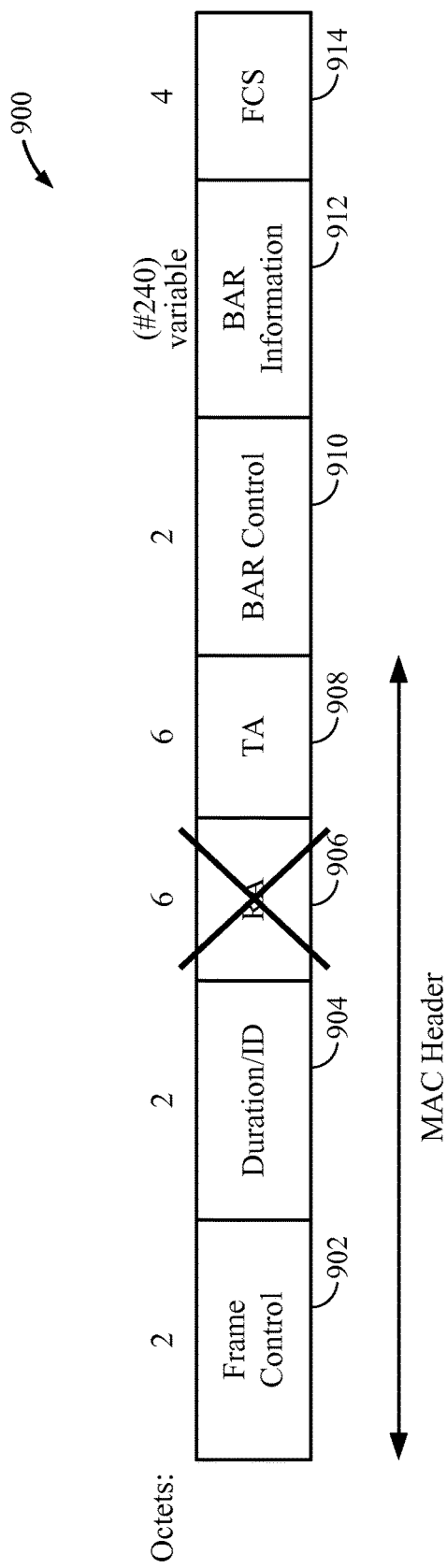
FIG. 14 illustrates an example of a multi-STA BAR frame with receiver address field removed, in accordance with certain aspects of the present disclosure.

According to certain aspects, the current BAR frame format may be modified by adding a 1 or 2 bytes 1310 to the BAR Information Field as shown in FIG. 13, for example, by expanding the PER TID information field 1202 including the allocation indications mentioned above (e.g., spatial stream/channel allocation per STA and power control). Another possible modification of the current BAR frame format may be to remove the receiver address field 906—which is assumed to be broadcast—as shown in FIG. 14. In this case, the type of the frame may need to be a new one, so that a receiver can parse the new format correctly.

Figure 15:
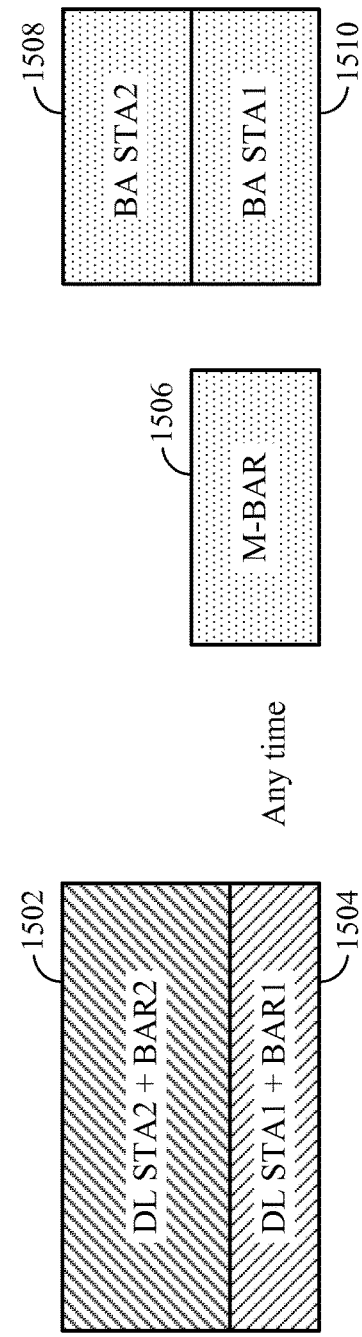
FIG. 15 illustrates an example frame exchange using a multi-STA BAR frame, in accordance with certain aspects of the present disclosure.

FIG. 15 illustrates an example frame exchange 1500 using a multi-STA BAR frame, in accordance with certain aspects of the present disclosure. As shown in FIG. 15, a single multi-STA BAR frame 1506 may be sent in a separate DL PPDU subsequent to the DL A-MPDU having data PSDUs 1502 and 1504 addressed to STA2 and STA1, respectively, and may request BAs 1508 and 1510 from STA2 and STA1, respectively.

Example MU Reverse Direction Grant

As discussed above, the AP may send DL MU-MIMO A-MPDUs to multiple STAs. In the DL MU-MIMO A-MPDUs, the AP may indicate that the transmission opportunity is transferred to the STAs. As discussed above, the recipient STAs may support UL MU-MIMO/FDMA and, thus, multiple recipient STAs may transmit UL MU PPDUs at the same time. According to certain aspects, the UL MU PPDUs may contain data or acknowledgements. As also discussed above, in order to reply, it may be desirable for the STAs to also know what transmission mode to and parameters to use for the reply.

According to certain aspects, the AP may indicate that a TXOP is granted to a recipient STA by a reverse direction grant (RDG) bit, for example, in the MAC header of each MPDU sent to one or more STAs. According to certain aspects, the AP may set the RDG bit for multiple STAs if the STAs are support MU-MIMO, UL FDMA, or both (e.g., HEW STAs). The grant may also specify the transmission mode and parameters for the response. According to certain aspects, the indication of the transmission mode and parameters may be conveyed according to any of the options discussed above for indicating the transmission mode and parameters.

According to certain aspects, since multiple STAs are involved, the TXOP may be returned to the AP after the STAs transmit the UL PPDU.

Figure 16:
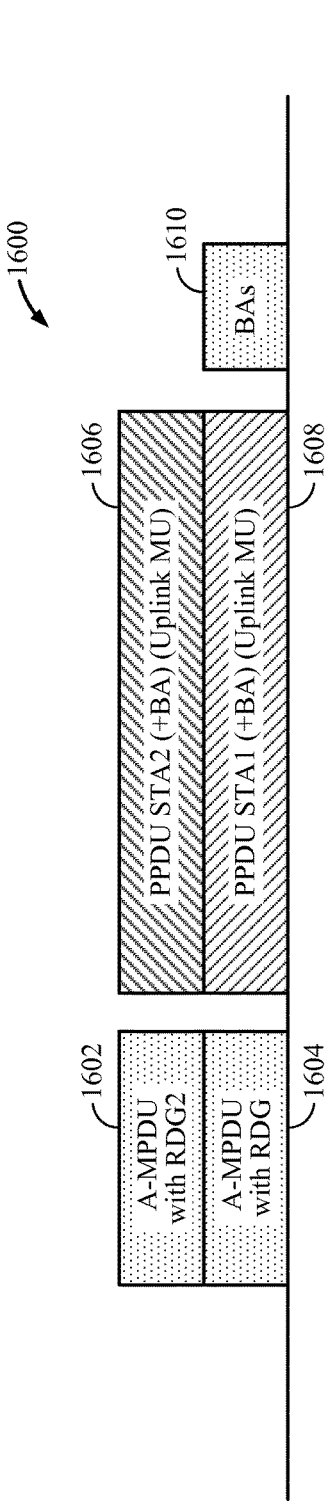
FIG. 16 illustrates an example frame exchange with reverse direction grants (RDG) included in each DL MU-MIMO/FDMA A-MPDU, in accordance with certain aspects of the present disclosure.

FIG. 16 illustrates an example frame exchange 1500 with RDGs included in each A-MPDU, in accordance with certain aspects of the present disclosure. As shown in FIG. 16, the AP may send a DL MU-MIMO/FDMA having A-MPDUs 1602 and 1604 addressed to STA2 and STA1, respectively, and each having an RDG bit (RDG2 and RDG1) in the MAC header. The RDG bits may grant a TXOP to the recipient STAs. Accordingly, STA2 and STA1 may each respond with UL MU-MIMO/FDMA PPDUs 1606 and 1608, respectively. According to certain aspects, BAs/ACKs may be aggregated with the UL PPDUs or, alternatively, a separate PSDU 1610 may be sent with ACK/BA.

Example Optimizations for UL MU-MIMO/FDMA

Efficiency of uplink UL MU-MIMO/FDMA communications may be limited if overhead cost is high. For example, the AP may use a special subframe as a trigger for each UL MU-MIMO transmission, which may increase overhead.

According to certain aspects of the present disclosure, approaches for overhead reductions for UL MU-MIMO or UL FDMA transmissions are provided. Overhead reductions may save preamble time and interframe spacing time for new messages. In an aspect, overhead reductions may entail aggregation of UL MU-MIMO/FDMA special subframe information in aggregated A-MPDUs of DL MU-MIMO or DL-FDMA packets. In another aspect, UL MU-MIMO/FDMA special subframe information may be aggregated with downlink ACKs (e.g., acknowledging UL data). If the parameter information in the special frame has already been communicated, the special subframe may simply act as a trigger. In another aspect, one special frame may be transmitted to schedule multiple UL MU-MIMO packets.

Example UL MU-MIMO/FDMA Triggered by Broadcast BA

Figure 17:
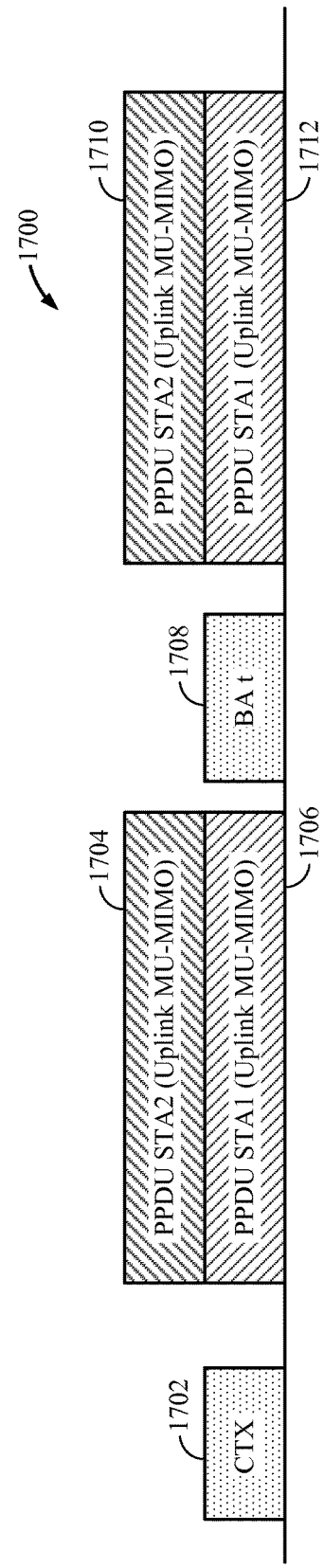
FIG. 17 illustrates an example frame exchange with a special frame transmitted at the beginning of the transmission opportunity to trigger a first UL response and a BA frame triggering a second UL response, in accordance with certain aspects of the present disclosure.

FIG. 17 illustrates an example frame exchange 1700 with a special subframe transmitted at the beginning of the transmission opportunity, in accordance with certain aspects of the present disclosure. As illustrated in FIG. 17, the AP may transmit a special frame 1702 at the beginning of the TXOP to trigger (e.g., solicit) immediate response from the recipient STAs. The special subframe may also define response parameters for UL MU-MIMO/FDMA transmissions for the entire TXOP time. According to certain aspects, the STAs may send a first set of packets in response to the special subframe. For example, the recipient STAs may transmit UL MU-MIMO/FDMA PPDUs 1704 and 1706. As shown in FIG. 17, the AP may then respond with block acknowledgments (BAs) 1708—granting another TXOP—which serves as a trigger for another UL MU-MIMO/FDMA transmission from the same set of recipient STAs. According to certain aspects, the AP may groupcast the BA. Alternatively, the AP may send the BA using DL MU-MIMO/FDMA. According to certain aspects, a bit (e.g., a RDG bit) in the BA may be used as a grant or trigger. According to certain aspects, the BA may have a token number matching the token number in the special frame. As shown in FIG. 17, the recipient STAs may respond immediately after the BA 1708 with UL MU-MIMO/FDMA PPDUs 1710 and 1712, for example, using the same parameters defined by the first special frame. According to certain aspects, the process of triggering an UL MU-MIMO/FDMA transmission with an ACK/BA frame may be repeated a desired number of times consecutively.

According to certain aspects, the AP may transmit a special frame including information for multiple UL MU-MIMO packets within the transmission opportunity. According to certain aspects, the special frame may define STA groups (e.g., UL MU PPDU groups) that may transmit PPDUs, for example, at different times. According to certain aspects, the special frame may specify an ordering according to which the groups may transmit PPDUs. The special frame may also specify transmission mode and parameters (e.g., duration, power, spatial streams, etc.) to be used by STAs in the groups. Alternatively, the STA groups, ordering, and other parameters may be pre-defined.

Example UL MU-MIMO/FDMA by Multiple Sets of STAs Triggered by Special Frame

Figures 18, 19:
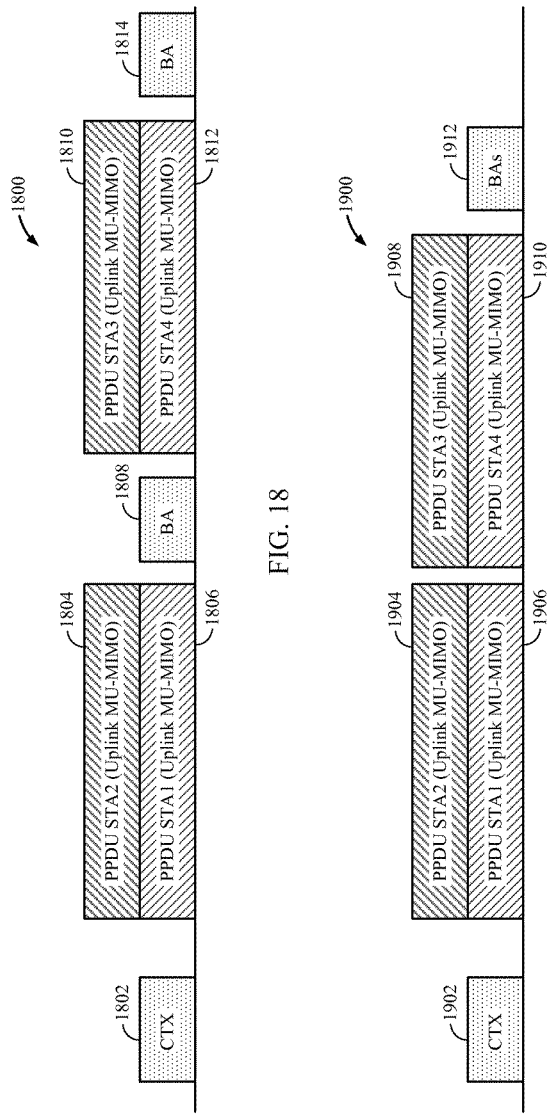
FIG. 18 illustrates an example frame exchange with a special frame transmitted at the beginning of the transmission opportunity to trigger responses from multiple sets of STAs, in accordance with certain aspects of the present disclosure.
FIG. 19 illustrates an example frame exchange with a special frame transmitted at the beginning of the transmission opportunity to trigger responses from multiple sets of STAs, in accordance with certain aspects of the present disclosure.

FIG. 18 illustrates an example frame exchange 1800 with a special frame transmitted at the beginning of the transmission opportunity to trigger responses from multiple sets of STAs, in accordance with certain aspects of the present disclosure. As shown in FIG. 18, the AP may send special frame 1802 defining a first set of STAs including STA2 and STA1 and a second set of STAs including STA3 and STA4. The first set of STAs (STA2 and STA1) may immediately respond after receiving the special frame. For example, STA2 and STA1 may send UL MU-MIMO/FDMA PPDUs 1804 and 1806, respectively. The AP may then respond with a BA 1808. According to certain aspects, the BA 1808 may have a counter indicating the group that can go next. According to certain aspects, the BA 1808 may have a bit (e.g., an RDG bit) granting the TXOP to the next set. As shown in FIG. 18, the second set of STAs (STA3 and STA4) may respond after the BA. For example, STA3 and STA4 may send UL MU-MIMO PPDUs 1810 and 1812, respectively. According to certain aspects, this frame exchange may continue or repeat a desired number of times. For example, as shown in FIG. 18, the AP may then send a second BA 1814 after which a third set of STAs may respond, and so on.

According to certain aspects, the special frame may schedule multiple sets of STAs to respond consecutively without a BA from the AP, for example, as shown in FIG. 19. FIG. 19 illustrates an example frame exchange 1900 with a special frame 1902 transmitted at the beginning of the transmission opportunity to trigger responses from multiple sets of STAs, in accordance with certain aspects of the present disclosure. As shown in FIG. 19, after the AP sends special frame 1902, the STA2 and STA1 may respond with UL MU-MIMO PPDUs 1904 and 1906, respectively, and then, before the AP sends a BA 1912, STA3 and STA4 may respond with UL MU-MIMO PPDUs 1908 and 1910, respectively. In the example illustrated in FIG. 19, the sets of STAs scheduled to transmit may transmit consecutively, each set taking the previous set's transmission as a trigger for its own. The AP may then send ACKs after all the set have finished transmitting.

Figure 20:
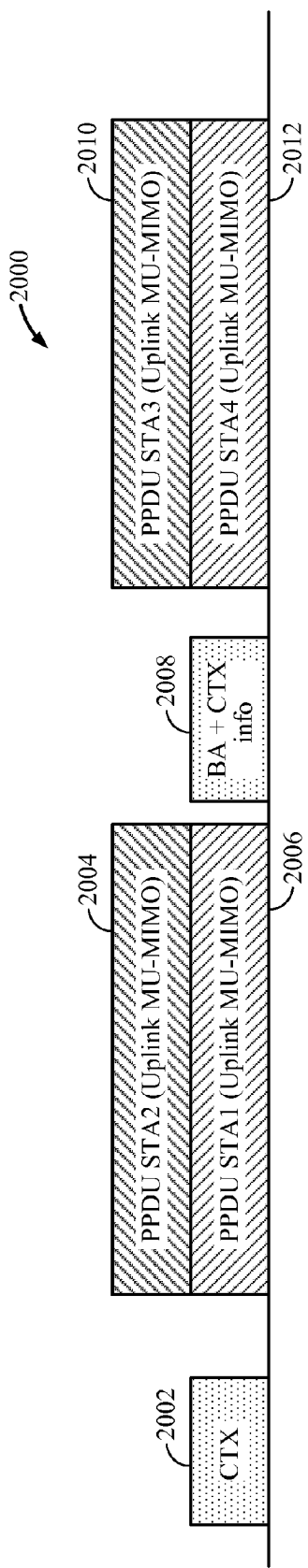
FIG. 20 illustrates an example frame exchange with a second special frame aggregated in a BA to trigger responses from different sets of STAs, in accordance with certain aspects of the present disclosure.

According to certain aspects, after the AP sends a special frame and receives uplink data from a first set of STAs, the AP may send a second special frame aggregated with the BA to schedule transmissions from a second set of STAs and illustrated in FIG. 20. As shown in FIG. 20, the AP may send a special frame 2002 scheduling STA2 and STA1 for uplink data and STA2 and STA1 may respond by sending UL MU-MIMO/FDMA PPDUs 2004 and 2006, respectively. According to certain aspects, the AP may then send BA 2008 aggregated with another special frame to schedule transmission from STA3 and STA4. STA3 and STA4 may respond by sending UL MU-MIMO/FDMA PPDUs 2010 and 2012, respectively. As illustrated in FIG. 20, UL MU-MIMO/FDMA responses may be triggered using a special frame aggregated in a BA message that may be directed to a different set of STAs than those being sent the ACKs/BA. According to certain aspects, power saving enhancements may be implemented based on the STAs indicated in the original special frame. The original special frame may indicate that only the STAs identified in the message are scheduled for transmission during the TXOP and, in response, the STAs not identified may enter a sleep or low-power mode.

Figure 21:
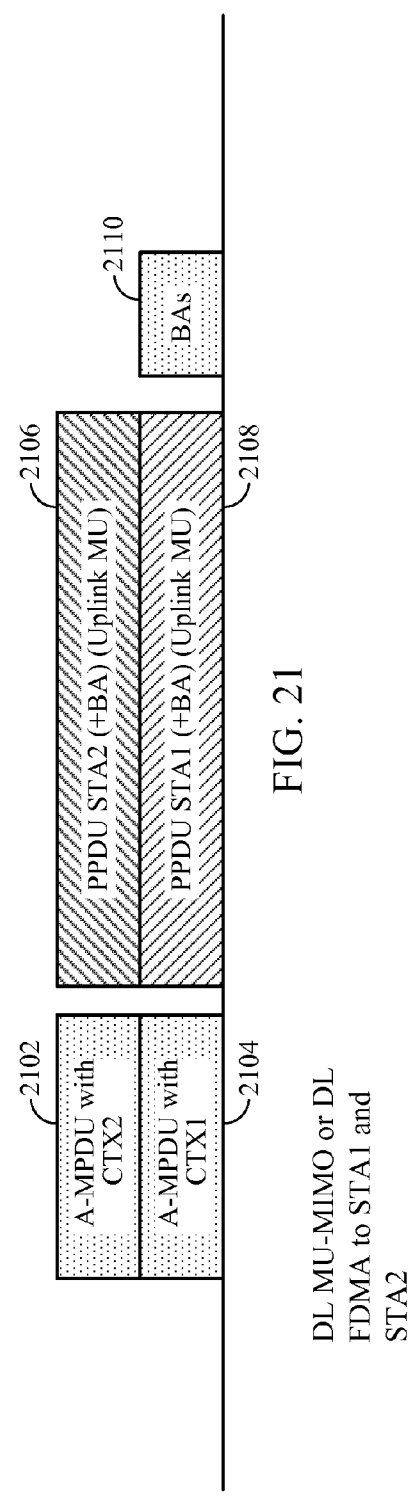
FIG. 21 illustrates an example frame exchange with a special frame aggregated in each DL MU-MIMO/FDMA A-MPDU, in accordance with certain aspects of the present disclosure.

According to certain aspects, special frames may be aggregated into A-MPDUs of downlink data, which indicate to the STAs receiving the data that they are to then transmit on the uplink immediately after the downlink data. The transmission may be MU-MIMO or FDMA. In certain aspects, if the downlink transmission is MU-MIMO, then the ensuing UL transmission will be MU-MIMO, and if the downlink transmission is FDMA, then the ensuing UL transmission will be FDMA. Special subframe information may be included in the PSDU for each user. A special frame may be aggregated in the A-MPDU and addressed to a single station. The information in the special subframe may also be sent in the delimiters, if a new format for the delimiters is made to allow this. Special subframe information may also be included in the service field. FIG. 21 illustrates an example frame exchange 2100 with special frames included in each DL MU-MIMO/FDMA A-MPDU to trigger uplink data, in accordance with certain aspects of the present disclosure. As shown in FIG. 21, the AP may send a DL MU-MIMO/FDMA having A-MPDUs 2102 and 2104 addressed to STA2 and STA1, respectively, and each A-MPDU aggregated with a special frame (CTX2 and CTX1). The special frames may schedule the recipient STAs. Accordingly, STA2 and STA1 may each respond with UL MU-MIMO/FDMA PPDUs 2106 and 2108, respectively. According to certain aspects, BAs/ACKs may be aggregated with the UL PPDUs or, alternatively, a separate PSDU 2110 may be sent with ACK/BA.

According to certain aspects, recipient STAs may aggregate ACKs with UL data to acknowledge DL data from the AP as shown in FIG. 22. For example, an ACK may be aggregated in an A-MPDU (e.g., in a service field). FIG. 22 illustrates an example frame exchange 2200 with ACKs aggregated with UL data, in accordance with certain aspects of the present disclosure. As shown in FIG. 22, the AP may send a DL MU-MIMO/FDMA having A-MPDUs 2202 and 2204 addressed to STA2 and STA1, respectively, and each A-MPDU aggregated with a special frame (CTX2 and CTX1). The special frames may schedule the recipient STAs. Accordingly, STA2 and STA1 may each respond with UL MU-MIMO/FDMA PPDUs 2206 and 2208, respectively. According to certain aspects, UL MU-MIMO/FDMA PPDUs 2206 and 2208 may be aggregated with ACKs corresponding to the DL data transmissions, A-MPDUs 2202 and 2204.

FIG. 23 illustrates an example frame exchange 2300 with UL ACKs aggregated in UL MU-MIMO/FDMA PPDUs and DL ACKs aggregated in DL MU-MIMO/FDMA A-MPDUs, in accordance with certain aspects of the present disclosure. As shown in FIG. 23, the AP may send a special frame 2302 to schedule UL MU-MIMO/FDMA data. Recipient STA2 and STA1 may respond with UL MU-MIMO/FDMA PPDUs 2304 and 2306, respectively. Rather than sending a separate BA, the AP may send DL MU-MIMO/FDMA A-MPDUs 2308 and 2310 with aggregated ACKs per STA. According to certain aspects, the ACKs may be included in a service field.

Figure 24:
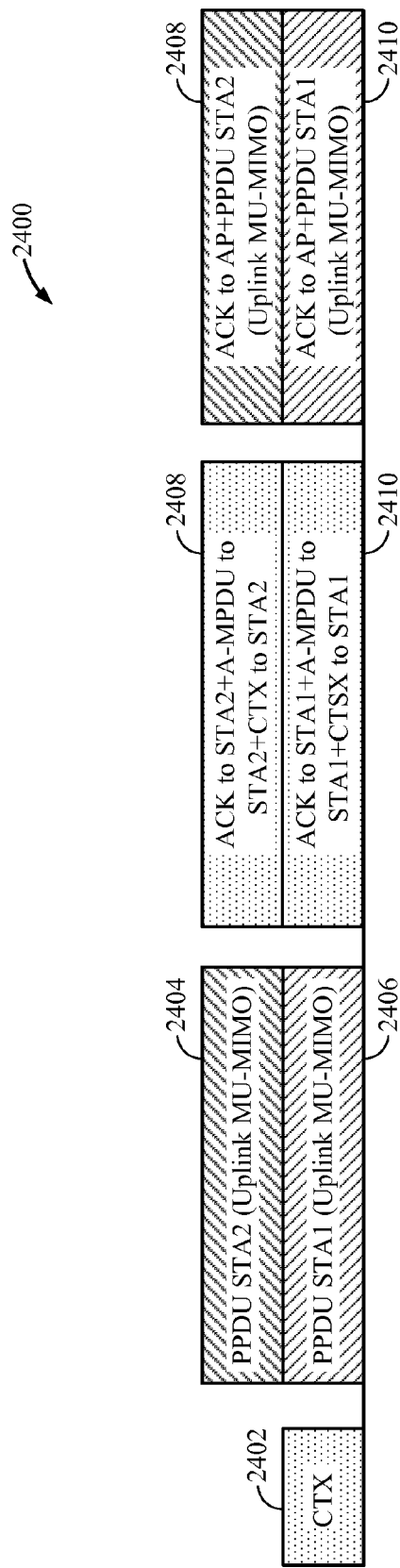
FIG. 24 illustrates an example frame exchange with UL ACKs aggregated in UL MU-MIMO/FDMA PPDUs and DL ACKs and special frames aggregated in DL MU-MIMO/FDMA A-MPDUs, in accordance with certain aspects of the present disclosure.

According to certain aspects, the AP may further aggregate special frames with the ACK and DL data, in order to schedule the STAs for UL data and ACKs. FIG. 24 illustrates an example frame exchange with UL ACKs aggregated in UL MU-MIMO/FDMA PPDUs and DL ACKs and special frames aggregated in DL MU-MIMO/FDMA A-MPDUs, in accordance with certain aspects of the present disclosure. As shown in FIG. 24, the AP may send a special frame 2402 to schedule UL MU-MIMO/FDMA data. Recipient STA2 and STA1 may respond with UL MU-MIMO/FDMA PPDUs 2404 and 2406, respectively. As in frame exchange 2300, rather than sending a separate BA, the AP may send DL MU-MIMO/FDMA A-MPDUs 2408 and 2410 with aggregated ACKs per STA. According to certain aspects, the AP may additionally aggregate special frame per STA with each ACK and A-MPDU to schedule the STAs for another TXOP. Accordingly, STA2 and STA1 may respond with UL MU-MIMO/FDMA PPDUs 2412 and 2412, respectively, aggregated with ACKs per STA in each PPDU. As shown in FIG. 24, uplink and downlink MU packets may be chained together. The downlink MU packet may include the ACKs to the previous UL MU packet as well as an indication to start a subsequent UL MU transmission and ACKs may be aggregated with the data in both uplink and downlink. According to certain aspects, the special frame 2402 may set up all of the UL MU packets and the aggregated special frames in the DL A-MPDUs 2408 and 2410 may only serve as triggers. According to certain aspects, the special frame in the DL A-MPDU may specify the parameters for the upcoming uplink MU packet. For example, the special frame in the DL A-MPDUs may specify, without limitation, the duration or number of spatial streams.

Figure 25:
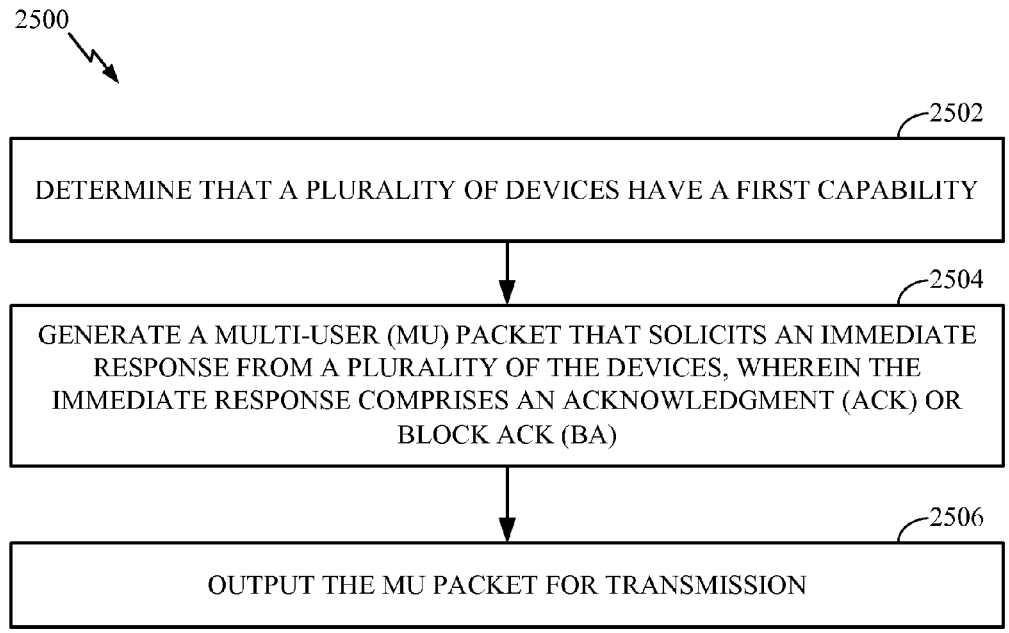
FIG. 25 illustrates example operations for wireless communications, in accordance with certain aspects of the present disclosure.

FIG. 25 illustrates example operations 2500 for wireless communications, in accordance with certain aspects of the present disclosure. The operations 2500 may be performed, for example, by an access point (e.g., AP 110). The operations 2500 may begin, at 2502, by determining that a plurality of devices (e.g., VHT STAs) have a first capability (e.g., support MU-MIMO or FDMA). For example, the AP may receive a capability information element (IE) (e.g., a VHT capability IE) from each of the plurality of devices indicating support for the first capability.

At 2504, the AP may generate a MU packet that solicits an immediate response from a plurality of the devices, wherein the immediate response comprises an ACK or BA. According to certain aspects, the MU packet may provide a response type indication to each of the plurality of devices, to use SU MIMO, MU MIMO, or FDMA to send the immediate response. In an example implementation, the MU packet may include a plurality of MPDUs, each MPDU being addressed to a different one of the plurality of devices and the response type indication may be provided in a QoS control field of each MPDU, a FC field of each MPDU, an A-MPDU delimiter preceding the MPDU, or an extended MAC header. Alternatively, the MU packet may include one or more PSDUs, each PSDU being address to a different one of the plurality of devices and the response type indication may be provided in a SERVICE field of the PSDU. In yet another alternative, the response type indication may be provided in a PHY header of the MU packet. In yet another alternative, the response type may be indicated by the presence of a special frame in the A-MPDU. In yet another alternative, the MU packet may include one or more group IDs, each of the one or more group IDs associated with whether to use SU MIMO, MU MIMO, or MU FDMA to send the immediate response, such that the response type indication is provided implicitly by the one or more group IDs. In yet another alternative, the AP may generate a special frame and output the special frame for transmission after the MU packet and the response type indication may be provided in the special frame. According to certain aspects, an indication of one or more parameters (e.g., spatial streams to use, channels, a duration, transmission power) to use for sending the immediate using MU MIMO or MU FDMA may be provided according to any of the alternatives described above for explicitly or implicitly providing the response type indication (e.g., group ID, special frame, MPDU field, PHY header).

In another example implementation, the first MU packet may include one or more BAR frames (e.g., aggregated with the A-MPDU). Each BAR frame may addressed to one or more devices and solicits a BA from the one or more devices addressed in the BAR frame. The response type indication and indication of parameters may be included in each BAR frame. Alternatively, the AP may generate a BAR frame and output the BAR frame for transmission subsequent to transmission of the MU packet. According to certain aspects, the BAR frame may be a multi-STA BAR frame (e.g., a TID BAR frame) addressed to multiple different ones of the plurality of devices.

In yet another example implementation, each A-MPDU may have a RDG bit soliciting the immediate response from the device addressed in the A-MPDU. According to certain aspects, the RDG may provide the response type indication and indication of parameters.

At 2506, the AP may output the MU packet for transmission.

According to certain aspects, the AP may generate a second MU packet that does not solicit an immediate response from the plurality of devices and output the second MU packet for transmission. The AP may determine that one or more other devices lack the first capability and generate a third MU packet that solicits an immediate response from at most a single one of the one or more other devices and output the third MU packet for transmission. According to certain aspects, the AP may determine that one or more other devices lack the first capability and generate a fourth MU packet that does not solicit an immediate response from either the plurality of devices or the one or more other devices and output the fourth MU packet for transmission. According to certain aspects, the AP may receive an MU packet from each of the plurality of devices including a plurality of A-MPDUs, each A-MPDU having an ACK associated with the MU packet. The AP may process the received MU packets to confirm that the MU packet sent by the AP was successfully received at each device.

Figure 26:
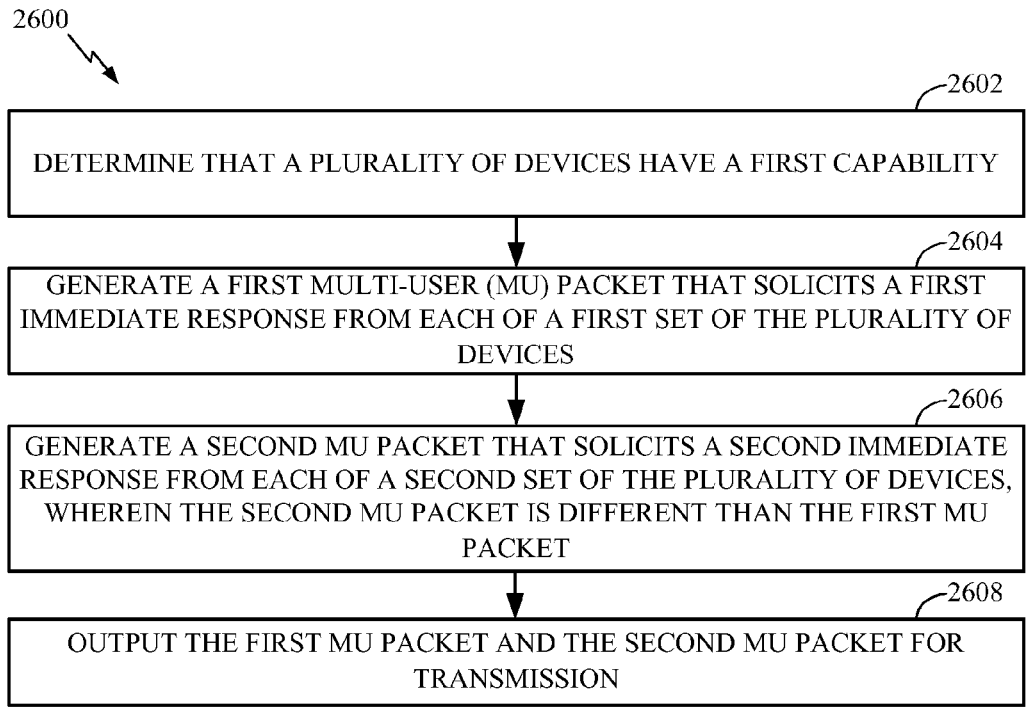
FIG. 26 illustrates example operations for wireless communications, in accordance with certain aspects of the present disclosure.

FIG. 26 illustrates example operations 2600 for wireless communications, in accordance with certain aspects of the present disclosure. The operations 2600 may be performed, for example, by an access point (e.g., AP 110). The operations 2600 may begin, at 2602, by determining that a plurality of devices (e.g., VHT STAs) have a first capability (e.g., support for MU-MIMO or MU FDMA). For example, the AP may receive an IE (e.g., a VHT capabilities IE) from each of the plurality of devices indicating support for the first capability.

At 2604, the AP may generate a first MU packet that solicits a first immediate response from each of a first set of the plurality devices. According to certain aspects, the first MU packet is a special frame. The special frame may indicate a response type (e.g., MU-MIMO or MU FDMA) and response parameters (e.g., spatial streams, channels, duration, and/or transmission power) to use for the solicited immediate responses or for all responses in the transmission opportunity. The special frame may indicate groups of solicited devices and may also indicate an order for the groups of stations to respond. The special frame may indicate which groups of devices will be scheduled to transmit, such that devices that will not be scheduled may sleep. The special frame may aggregated with DL data (e.g., in a DL MU-MIMO PPDU or a DL MU FDMA PPDU). According to certain aspects, the immediate responses may include aggregated ACK indicating whether the DL data was successfully received.

At 2606, the AP may generate a second MU packet that solicits a second immediate response from each of a second set of the plurality of devices (e.g., which may be the same or different than the first set of devices), wherein the second MU packet is different than the first MU packet. According to certain aspects, the first and second immediate responses may be UL MU MIMO or UL FDMA data frames (e.g., A-MPDUs). According to certain aspects, the second MU packet may be a BA (e.g., groupcast or DL MU) indicating whether the previous immediate responses were successfully received (e.g., using a RDG bit). The second MU packet may have a token number matching a token number associated with the first MU packet. Where the special frame indicates a transmission order for groups of stations, the second packet may include a counter to determine which group is to transmit next. According to certain aspects, the BA may also be aggregated with a special frame.

At 2608, the AP may output the first MU packet and the second MU packet for transmission.

Figure 25A:
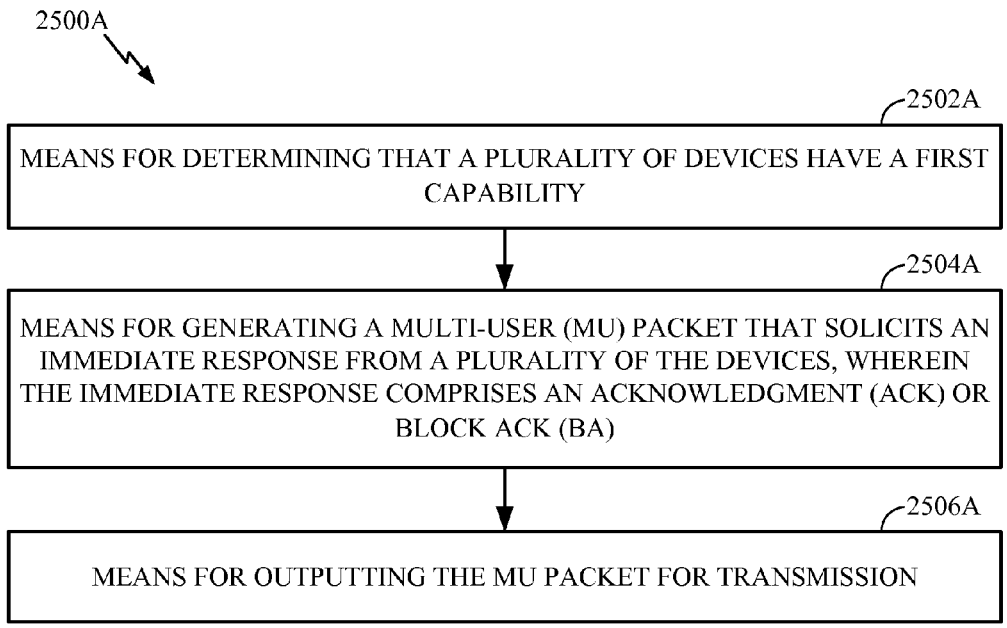
FIG. 25A illustrates example means capable of performing the operations shown in FIG. 25, in accordance with certain aspects of the present disclosure.
Figure 26A:
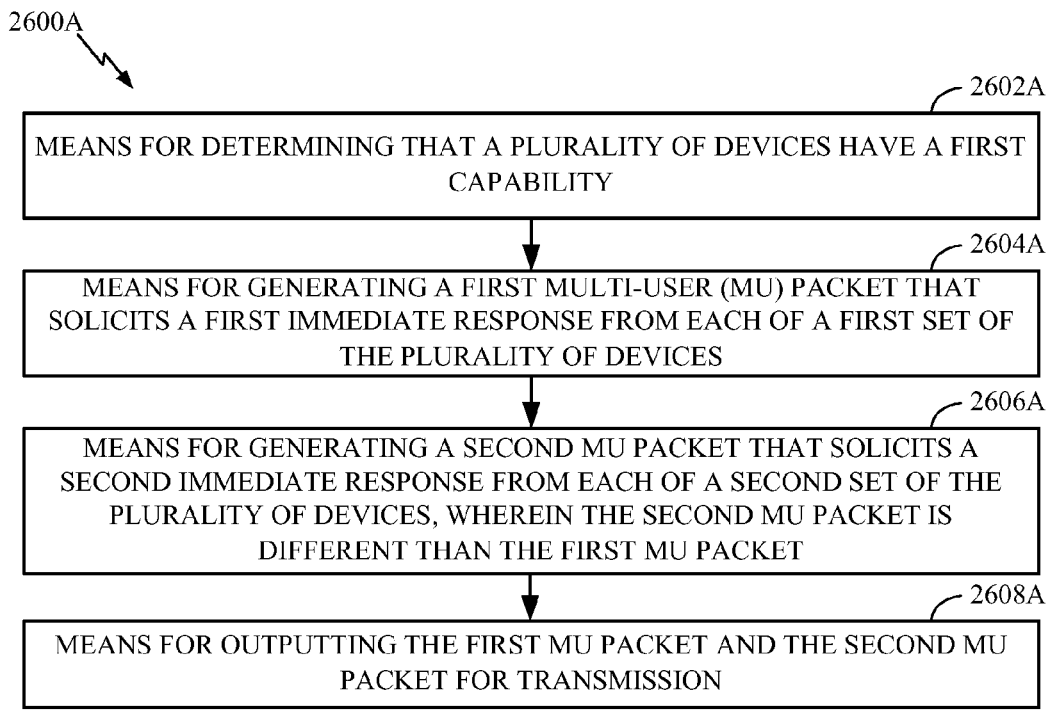
FIG. 26A illustrates example means capable of performing the operations shown in FIG. 26, in accordance with certain aspects of the present disclosure.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 2500 illustrated in FIG. 25 correspond to means 2500A in FIG. 25A and operations 2600 illustrated in FIG. 26 correspond to means 2600A in FIG. 26A.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3.

In some case, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission Means for processing, means for generating, means for outputting, and/or means for determining may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a processing system configured to generate a multi-user (MU) packet that solicits an immediate response from each of a plurality of devices to be obtained simultaneously, wherein the immediate response comprises an acknowledgment (ACK) or block ACK (BA), wherein:
the MU packet provides a response type indication to each of the plurality of devices to use multiple user (MU) MIMO or frequency division multiple access (FDMA) to send the immediate response, and
the MU packet provides an indication of one or more parameters to use for sending the immediate response if the response type indication indicates to use MU MIMO or MU FDMA for the immediate response, the indication of one or more parameters comprising an indication of at least one of: one or more spatial streams to use, one or more channels to use, a duration to use, or a transmission power to use; and
an interface configured to output the MU packet for transmission.

2. The apparatus of claim 1, wherein:
the processing system is further configured to generate another MU packet that does not solicit an immediate response from the plurality of devices; and
the interface is further configured to output the other MU packet for transmission.

3. The apparatus of claim 1, wherein:
the processing system is configured to determine that the plurality of devices have a first capability:
the generation of the MU packet that solicits the immediate response from each of the plurality of devices is in response to the determination that the plurality of devices have the first capability;
the processing system is further configured to determine that one or more other devices lack the first capability and generate another MU packet that solicits an immediate response from at most a single one of the one or more other devices; and
the interface is further configured to output the other MU packet for transmission.

4. The apparatus of claim 1, wherein:
the processing system is configured to determine that the plurality of devices have a first capability;
the generation of the MU packet that solicits the immediate response from each of the plurality of devices is in response to the determination that the plurality of devices have the first capability;
the processing system is further configured to determine that one or more other devices lack the first capability and to generate another MU packet that does not solicit an immediate response from either the plurality of devices or the one or more other devices; and
the interface is further configured to output the other MU packet for transmission.

5. The apparatus of claim 1, wherein:
the processing system is configured to determine that the plurality of devices have a first capability;
the generation of the MU packet that solicits the immediate response from each of the plurality of devices is in response to the determination that the plurality of devices have the first capability; and
the first capability comprises support for at least one of multiple user multiple-input multiple-output (MU-MIMO) or frequency division multiple access (FDMA).

6. The apparatus of claim 1, wherein:
the MU packet comprises a plurality of media access control (MAC) protocol data units (MPDUs), each of the MPDUs being addressed to a different one of the plurality of devices; and
the response type indication is provided in:
a quality of service (QoS) control field of each MPDU;
a frame control (FC) field of each MPDU;
an aggregated MPDU (A-MPDU) delimiter preceding the MPDU; or
an extended MAC header.

7. The apparatus of claim 1, wherein:
the MU packet comprises one or more physical layer convergence protocol (PLCP) service data unit (PSDU), each PSDU being addressed to a different one of the plurality of devices; and
the response type indication is provided in a SERVICE field of the PSDU.

8. The apparatus of claim 1, wherein the response type indication is provided in a PHY header of the MU packet.

9. The apparatus of claim 1, wherein:
the MU packet comprises a plurality of aggregated medium access control (MAC) protocol data unit (A-MPDUs), each of the A-MPDUs being addressed to a different one of the plurality of devices; and
if a special frame is present in the A-MPDU, the response type is indicated in the special frame.

10. The apparatus of claim 1, wherein:
the MU packet includes one or more group IDs;
each of the one or more group IDs is associated with whether to use MU MIMO or MU FDMA to send the immediate response; and
the response type indication is provided implicitly by the one or more group IDs.

11. The apparatus of claim 1, wherein:
the MU packet includes one or more group IDs;
each of the one or more group IDs is associated with one or more parameters; and
the indication of parameters is provided implicitly by the one or more group IDs.

12. The apparatus of claim 1, wherein:
the MU packet comprises a plurality of media access control (MAC) protocol data units (MPDUs), each of the MPDUs being addressed to a different one of the plurality of devices; and
the indication of parameters is provided in:
a quality of service (QoS) control field of each MPDU;
a frame control (FC) field of each MPDU;
an aggregated MPDU (A-MPDU) delimiter preceding the MPDU; or
an extended MAC header.

13. The apparatus of claim 1, wherein the indication of parameters is provided in a PHY header of the MU packet.

14. The apparatus of claim 1, wherein:
the MU packet comprises a plurality of aggregated medium access control (MAC) protocol data unit (A-MPDUs), each of the A-MPDUs being addressed to a different one of the plurality of devices; and
if a special frame is present in the A-MPDU, the parameters are indicated in the special frame.

15. The apparatus of claim 1, wherein:
the MU packet comprises a plurality of block ACK request (BAR) frames that solicit BAs as the immediate responses
each of the BAR frames is addressed to one or more of the plurality of devices and solicits a BA from the one or more of the plurality of devices addressed in the BAR frame;
each of the BAR frames includes a respective one of the response type indications; and
each of the BAR frames includes a respective one of the indications of one or more parameters.

16. The apparatus of claim 15, wherein:
the MU packet comprises a plurality of aggregated medium access control (MAC) protocol data unit (A-MPDUs), each of the A-MPDUs being addressed to a different one of the plurality of devices, and
each of the BAR frames is aggregated with the A-MPDU addressed to the same device.

17. The apparatus of claim 15, wherein:
at least one BAR frame is addressed to multiple different ones of the plurality of devices,
the at least one BAR frame comprises a multiple traffic identifier (TID) BAR frame, and
at least one of reserved bits in a control field or TID information associated with each of the multiple TID BARS is used to provide an indication of a BAR type.

18. The apparatus of claim 1, wherein:
the MU packet comprises a plurality of aggregated medium access control (MAC) protocol data unit (A-MPDUs), each A-MPDU being addressed to a device of the plurality of devices;
each of the A-MPDUs having a reverse direction grant (RDG) soliciting the immediate response from the device addressed in the A-MPDU; and
each RDG includes one of the response type indications to the device addressed in the A-MPDU.

19. The apparatus of claim 1, wherein:
the MU packet comprises a plurality of aggregated medium access control (MAC) protocol data unit (A-MPDUs), each A-MPDU being addressed to a different one of the plurality of devices; and
each of the A-MPDUs has a special frame that provides the response type indication to each of the plurality of devices.

20. The apparatus of claim 1, wherein:
the MU packet comprises a plurality of aggregated medium access control (MAC) protocol data unit (A-MPDUs), each of the A-MPDUs being addressed to a device; and
each of the A-MPDUs has a special frame that solicits the immediate response.

21. The apparatus of claim 1, wherein:
the interface is further configured to obtain another MU packet from each of the plurality of devices;
the MU packet comprises a plurality of aggregated medium access control (MAC) protocol data units (A-MPDUs);
each of the A-MPDUs comprises an ACK associated with the MU packet; and
the processing system is configured to process said another MU packet to confirm that the MU packet was successfully received.

22. The apparatus of claim 1, wherein:
the interface is further configured to obtain an information element (IE) from each of the plurality of devices indicating support for a first capability;
the processing system is configured to determine that the plurality of devices have a first capability based on the IEs; and
the generation of the MU packet that solicits the immediate response from each of the plurality of devices is in response to the determination that the plurality of devices have the first capability.

23. A method for wireless communications, comprising:
generating a multi-user (MU) packet that solicits an immediate response from each of a plurality of devices to be obtained simultaneously, wherein the immediate response comprises an acknowledgment (ACK) or block ACK (BA), wherein:
the MU packet provides a response type indication to each of the plurality of devices to use multiple user (MU) MIMO or frequency division multiple access (FDMA) to send the immediate response, and
the MU packet provides an indication of one or more parameters to use for sending the immediate response if the response type indication indicates to use MU MIMO or MU FDMA for the immediate response, the indication of one or more parameters comprising an indication of at least one of: one or more spatial streams to use, one or more channels to use, a duration to use, or a transmission power to use; and
outputting the MU packet for transmission.

24. An access point (AP), comprising:
a processing system configured to generate a multi-user (MU) packet that solicits an immediate response from each of a plurality of devices to be received simultaneously, wherein the immediate response comprises an acknowledgment (ACK) or block ACK (BA), wherein:
 the MU packet provides a response type indication to each of the plurality of devices to use multiple user (MU) MIMO or frequency division multiple access (FDMA) to send the immediate response, and
 the MU packet provides an indication of one or more parameters to use for sending the immediate response if the response type indication indicates to use MU MIMO or MU FDMA for the immediate response, the indication of one or more parameters comprising an indication of at least one of: one or more spatial streams to use, one or more channels to use, a duration to use, or a transmission power to use; and
a transmitter configured to transmit the MU packet.

25. The apparatus of claim 1, wherein the FDMA comprises orthogonal frequency division multiple access (OFDMA).

\* \* \* \* \*